(12) United States Patent
Zhou et al.

(10) Patent No.: US 12,474,701 B2
(45) Date of Patent: Nov. 18, 2025

(54) REMOTE CONTROLLERS AND STRUCTURES AND SYSTEMS THEREOF

(71) Applicant: SZ DJI TECHNOLOGY CO., LTD., Shenzhen (CN)

(72) Inventors: Youquan Zhou, Shenzhen (CN); Yiqing Chen, Shenzhen (CN); Songquan Mo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 238 days.

(21) Appl. No.: 18/132,358

(22) Filed: Apr. 7, 2023

(65) Prior Publication Data
US 2023/0244224 A1   Aug. 3, 2023

Related U.S. Application Data

(63) Continuation of application No. PCT/CN2021/077742, filed on Feb. 24, 2021.

(30) Foreign Application Priority Data

Dec. 24, 2020   (CN) .......................... 202023172678.8

(51) Int. Cl.
*G05D 1/00*   (2024.01)
*B64U 10/00*   (2023.01)
*B64U 101/30*   (2023.01)

(52) U.S. Cl.
CPC .......... *G05D 1/0016* (2013.01); *B64U 10/00* (2023.01); *B64U 2101/30* (2023.01); *B64U 2201/20* (2023.01)

(58) Field of Classification Search
CPC ................ B64U 10/00; B64U 2101/30; B64U 2201/20; G08C 17/02
See application file for complete search history.

(56) References Cited

U.S. PATENT DOCUMENTS

2006/0229034 A1*   10/2006   Gizis ...................... A63H 30/04
                                                            455/95
2010/0302359 A1   12/2010   Adams et al.
(Continued)

FOREIGN PATENT DOCUMENTS

CN   201912778 U   8/2011
CN   204017385 U   12/2014
(Continued)

OTHER PUBLICATIONS

CN 106200629; Zhong et al.; A UAV Flight Control System Fault Detection Analysis Method (Year: 2016).*
(Continued)

*Primary Examiner* — Kito R Robinson
*Assistant Examiner* — Roy Rhee

(57) ABSTRACT

A remote controller for controlling a movable device, such as an unmanned aerial vehicle (UAV) is provided. The remote controller includes a handheld portion. A top portion of the handheld portion extends from the handheld portion at an angle. The top portion extends further forward than a remainder of the handheld portion. The remote controller further includes a first control component on a first side of the top portion and a second control component on a rear side of the top portion. The first control component is configured to control a gimbal of the UAV or a load carried by the UAV. The rear side is adjacent to the first side. The second control component is configured to control movement of the UAV.

20 Claims, 20 Drawing Sheets

(56) References Cited

U.S. PATENT DOCUMENTS

| | | | | |
|---|---|---|---|---|
| 2017/0349277 A1* | 12/2017 | Erhart | .................. | G05D 1/0808 |
| 2019/0075252 A1* | 3/2019 | Zhao | ....................... | G01P 13/00 |
| 2020/0387238 A1* | 12/2020 | Parazynski | ............ | A63H 30/04 |

FOREIGN PATENT DOCUMENTS

| | | | |
|---|---|---|---|
| CN | 104511172 | A | 4/2015 |
| CN | 205608991 | U | 9/2016 |
| CN | 106374211 | A | 2/2017 |
| CN | 206249237 | U | 6/2017 |
| CN | 107031838 | A | 8/2017 |
| CN | 107256625 | A | 10/2017 |
| CN | 107705530 | A | 2/2018 |
| CN | 107943088 | A | 4/2018 |
| CN | 108767452 | A | 11/2018 |
| CN | 108958351 | A | 12/2018 |
| CN | 109983415 | A | 7/2019 |
| CN | 110709144 | A | 1/2020 |
| CN | 110808450 | A | 2/2020 |
| CN | 210113177 | U | 2/2020 |
| CN | 111603779 | A | 9/2020 |
| KR | 101517475 | B1 | 5/2015 |
| KR | 101859762 | B1 | 6/2018 |

OTHER PUBLICATIONS

International Search Report of PCT/CN2021/077742 (Sep. 28, 2021).

* cited by examiner

US 12,474,701 B2

REMOTE CONTROLLERS AND STRUCTURES AND SYSTEMS THEREOF

RELATED APPLICATIONS

This application is a continuation application of PCT application No. PCT/CN2021/077742, filed on Feb. 24, 2021, which claims the benefit of priority of CN202023172678.8, filed on Dec. 24, 2020, and the contents of the foregoing documents are incorporated herein by reference in the entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to remote controllers, structures of remote controllers, systems of remote controllers, and control components of remote controllers. The present disclosure also relates particularly to remote controllers for controlling movable devices such as unmanned aerial vehicles (UAVs).

BACKGROUND

There exist many types of handheld remote controllers today, which utilize certain user input mechanisms. Having a touch screen on a handheld remote controller can enable a user to send a variety of user commands, but is at the expense of requiring the user to look at the touch screen when controlling. For controlling processes such as a user controlling a moving vehicle, it is preferable that the user can free his/her eyes from other tasks and focus on the vehicle or environment of the vehicle when controlling. User input mechanisms such as buttons, switches, triggers, joysticks, can be configured to enable the user to send user commands without having to look at the handheld remote controller. Somatosensory controlling, where a user can send user commands by moving the remote controller, is another way to free the user from having to look at the handheld remote controller when operating the remote controller.

Ease to control and comfort when handling are also important aspects of remote controllers. Single-handheld remote controllers are advantageous in these aspects, and can also free one hand of a user to do other tasks when the other hand is handling the controller. However, given the relatively small surface of a single-handheld remote controller, it is challenging to allocate various control components on the surface, to incorporate various user input mechanisms, and to prevent the user input mechanisms from interfering with each other. This is particularly challenging when the single-handheld remote controller is configured to minimize the user's need to look at the remote controller when controlling.

Therefore, there exists a need for improved remote controllers and improved control components of remote controllers.

SUMMARY

Consistent with some exemplary embodiments of the present disclosure, a remote controller for controlling a movable device, such as an unmanned aerial vehicle (UAV), is disclosed. The remote controller includes a handheld portion. The handheld portion includes a top portion. The remote controller further includes a first control component on a first side of the top portion and a second control component on a rear side of the top portion. The first control component is configured to control a gimbal of the UAV or a load carried by the UAV. The rear side is adjacent to the first side. The second control component is configured to control movement of the UAV.

Consistent with some exemplary embodiments of the present disclosure, a remote controller includes a handheld portion, a main bracket located inside the remote controller, and one or more control components on the top portion of the handheld portion configured to control a UAV. A top portion of the handheld portion extends from the handheld portion at an angle. The top portion extends further forward than a remainder of the handheld portion. One or more electronic components are disposed on the main bracket. The main bracket and the one or more electronic components disposed thereon are fully located within an internal space of the remote controller. The main bracket is configured to accommodate the angle by being located in the internal space of the remote controller in conformance with the angle.

Consistent with some exemplary embodiments of the present disclosure, a remote controller includes a handheld portion, one or more control components on the top portion of the handheld portion configured to control a UAV, and a main bracket located inside the remote controller. The handheld portion includes a top portion extending from a remainder of the handheld portion at an angle. The top portion extends further forward than the remainder of the handheld portion. One or more electronic components are disposed on the main bracket. The one or more electronic components are disposed out of contact with the handheld portion. The main bracket is configured to accommodate the angle by being located in an internal space of the remote controller in conformance with the angle.

Consistent with some exemplary embodiments of the present disclosure, a remote controller includes a handheld portion, a first control component on a first side of the handheld portion of the remote controller configured to receive input from the thumb of a user, and a second control component on a front face of the handheld portion of the remote controller configured to receive input from the index finger of the user.

Consistent with some exemplary embodiments of the present disclosure, a remote controller includes a bracket, a trigger arm rotationally attached to the bracket for controlling a UAV, and a sensor configured to measure an angular displacement of the trigger arm. The trigger arm is configured to control one or more motors of the UAV to rotate at a speed related to the angular displacement measured by the sensor Consistent with some exemplary embodiments of the present disclosure, a trigger includes a bracket, a rotation portion disposed on the bracket, the rotation portion rotatable around a longitudinal axis of the rotation portion, a trigger arm rotationally attached to the rotation portion, and an elastic portion attached to the trigger arm. The elastic portion applies a restoring torque on the trigger arm, the restoring torque is substantially proportional to an angular displacement of the trigger arm.

Consistent with some exemplary embodiments of the present disclosure, a remote controller for controlling a UAV includes a bracket and an operating member rotatably coupled to the bracket. The operating member is configured to move between a first position and a second position. The first position corresponds to a locked state of the UAV. The second position corresponds to an unlocked state of the UAV. The operating member is at a transition position between the first position and the second position, the operating member receives a transition torque towards the first position or the second position.

It is to be understood that both the foregoing general description and the following detailed description are exemplary and explanatory only, and are not restrictive of the disclosure, as claimed.

DETAILED DESCRIPTION

Figure 1A:
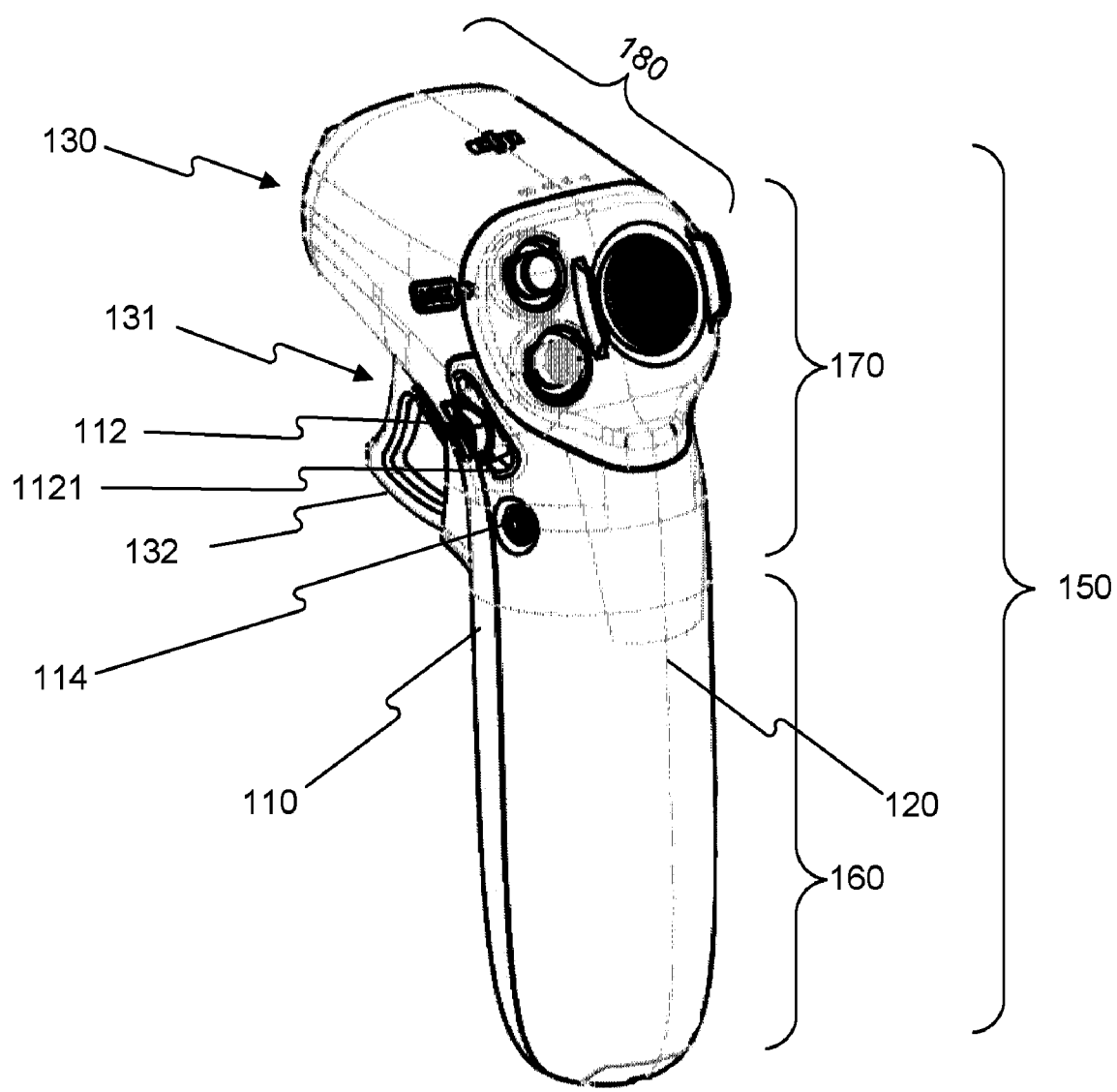
FIGS. 1A and 1B show an exemplary remote controller according to some exemplary embodiments of the present disclosure.

The following detailed description refers to the accompanying drawings. Wherever possible, the same reference numbers refer to the same or similar parts. While several illustrative embodiments are described herein, modifications, adaptations and other implementations are possible. For example, substitutions, additions or modifications may be made to the components illustrated in the drawings. Accordingly, the following detailed description is not limited to the disclosed embodiments and examples. Instead, the proper scope is defined by the appended claims.

Consistent with some exemplary embodiments of the present disclosure, there are provided remote controllers, remote control systems, and control components of remote controllers.

Figure 1B:
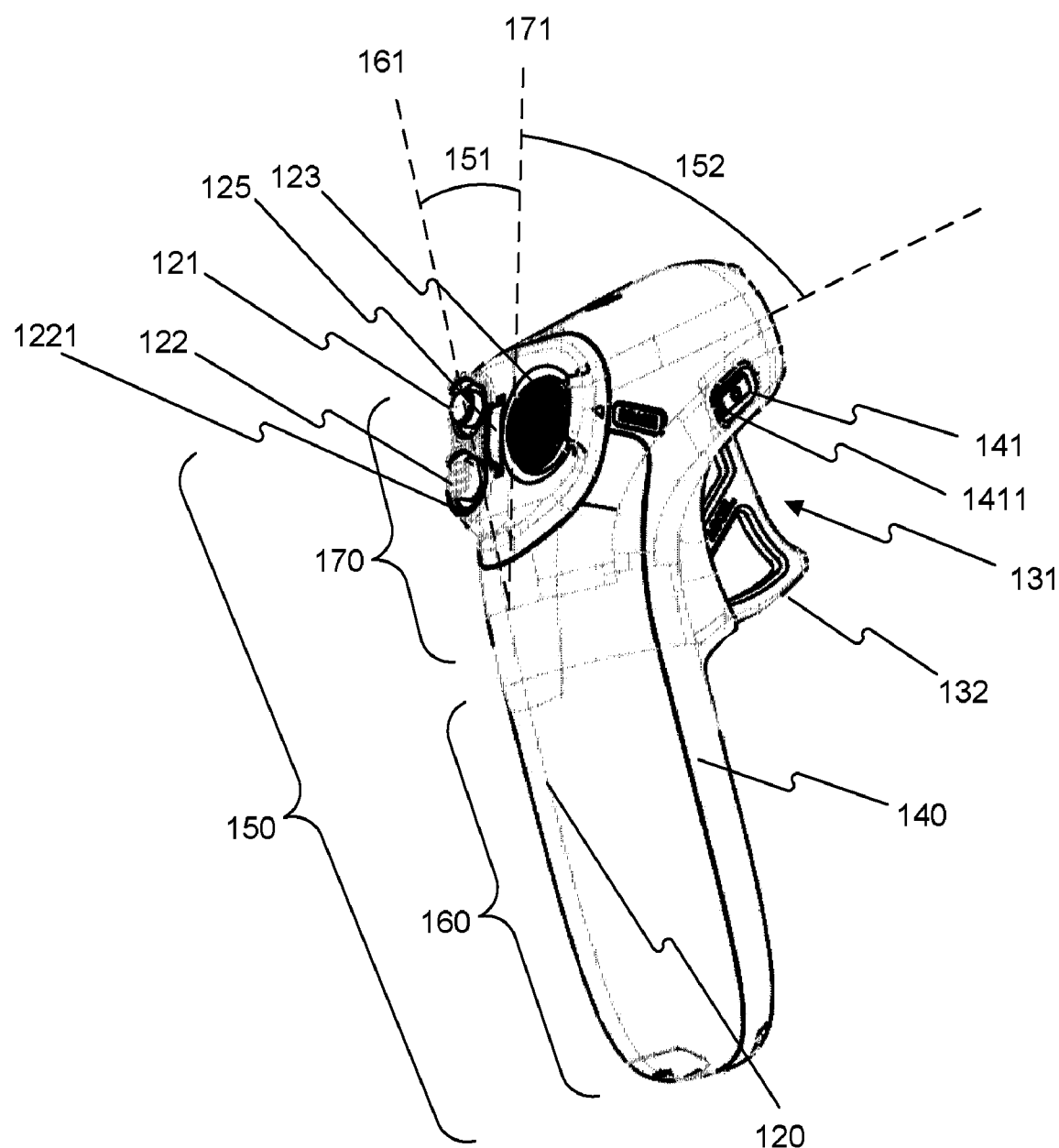

FIGS. 1A and 1B show an exemplary remote controller 100 according to some exemplary embodiments of the present disclosure. In FIGS. 1A and 1B, remote controller 100 includes a first side 110, a rear side 120, a front face 130, and a second side 140. Second side 140 is opposite to first side 110. Rear side 120 is opposite to front face 130. Rear side 120 is adjacent to first side 110. In some exemplary embodiments, one or more sides of the remote controller may include a curved shape. For example, at least a portion of rear side 120 includes a curved shape in connection with first side 110, instead of having a sharp edge in connection with first side 110. This may make holding remote controller 100 more comfortable for a user. In FIGS. 1A and 1B, remote controller 100 is configured to be held and operated by the right hand of the user. A configuration in mirror symmetry according to the present disclosure can be constructed to provide a remote controller suitable for being held and operated by the left hand of the user. For example, a configuration with respect to first side 110 of a remote controller suitable for being held by a right hand, as described with reference to FIGS. 1A and 1B, can be the configuration with respect to second side 140 for a controller suitable for being held by a left hand; and a configuration with respect to second side 140 of a controller suitable for being held by a right hand, as described with reference to FIGS. 1A and 1B, can be the configuration with respect to first side 110 for a controller suitable for being held by a left hand. Remote controller 100 is configured to control a movable device. In some exemplary embodiments, the movable device may be a vehicle, such as a car, a robot, a toy tank, or an unmanned aerial vehicle (UAV). In some exemplary embodiments, remote controller 100 is further configured to control a part of the movable device. For example, the movable device may be a UAV and remote controller 100 may be configured to control a gimbal of the UAV. The gimbal may be configured to allow a load carried by the gimbal to rotate about one or more axes. Remote controller 100 may be further configured to control the rotation of the load, including adjusting the pitch angle of the load.

In some exemplary embodiments, remote controller 100 is further configured to control a load carried by the movable device. In some exemplary embodiments, the load includes a sensing device. The sensing device may include devices for collecting or generating data or information, such as surveying, tracking, and capturing images or videos of targets (e.g., objects, landscapes, subjects of photo or video shoots, etc.). The sensing device may include an imaging sensor configured to collect data that may be used to generate images or videos. In some exemplary embodiments, the load may include a sprayer. The sprayer may include devices for storing pesticides and devices for spraying pesticides.

Remote controller 100 includes a handheld portion 150 for a user to hold remote controller 100. Handheld portion 150 is of a suitable size to allow the user to hold remote controller 100 with one hand. This frees the other hand of the user when the user is using remote controller 100. In some exemplary embodiments, a top portion 170 of handheld portion 150 extends from the remainder of handheld portion 150. In FIGS. 1A and 1B, the remainder of handheld portion 150 excluding top portion 170 is diagrammatically represented as a portion 160.

In some exemplary embodiments, for controlling processes such as controlling a moving vehicle using remote controller 100, the user can free his/her eyes from other tasks and pay attention to the moving vehicle and environment when controlling. But using remote controller 100 without looking at remote controller 100 presents challenges to the user as to accurately knowing the locations of control components on remote controller 100, especially when the user is paying close attention to other things such as the movement of the moving vehicle and its environment. Limiting the locations of control components, or at least frequently used control components, to a certain portion of remote controller 100 is one way to make it easier for the user to know the locations of control components as compared to arranging their locations all over remote controller 100. For example, in some exemplary embodiments, the control components may be located only in top portion 170 such that when the user is operating remote controller 100, the user can put finger tips on top portion 170 with control components close to the finger tips, without having to look at remote controller 100 to find the control components. The control components on first side 110 of remote controller 100 are thus also on first side 110 of top portion 170. Similarly, the control components on rear side 120 are also on rear side 120 of top portion 170; the control components on front face 130 are also on front face 130 of top portion 170; and the control components on second side 140 are also on second side 140 of top portion 170.

In some exemplary embodiments, top portion 170 extends more forwardly, i.e., further forward, than the remainder of handheld portion 150. As shown in FIG. 1B, portion 160 has a top-bottom axis 161. When the user holds remote controller 100 in a vertical direction that is normal to the ground, top-bottom axis 161 is also vertical and normal to the ground. As used herein, the ground refers to a horizontal surface on which a user stands while holding and operating remote controller 100. In FIG. 1B, top portion 170 extends towards a direction 171 that is more forward than the remainder portion 160 of handheld portion 150 and that forms an angle 151 with axis 161. Angle 151 is an acute angle, which as used herein is greater than 0 degrees and less than 90 degrees. This angle lets the user know the location of top portion 170 by the user's feeling from holding remote controller 100 without having to look at it. This may also make the holding and operating of remote controller 100 more comfortable for the user. For example, if the user holds portion 160 with the palm and fingers of one hand and stretches the thumb of the hand to touch control components on top portion 170, the stretching of the thumb may be easier if top portion 170 extends forward, e.g., by angle 151. As compared to simply making top portion 170 smaller and/or making control components on top portion 170 smaller, having angle 151 at an acute angle can ease the holding and operating of remote controller 100 with less sacrifice of the size and surface area. In some exemplary embodiments, top portion 170 may extend from handheld portion 150 without forming an acute angle (i.e., angle 151 being zero).

Remote controller 100 includes an antenna portion 180, including an antenna, extending from top portion 170. In some exemplary embodiments, the antenna may be housed in antenna portion 180. In some exemplary embodiments, the antenna may be disposed on an outer surface of antenna portion 180.

When the user is holding remote controller 100 to control a movable device, it is natural that the user looks at the movable device in the front direction, i.e., a forward direction in front of the user. If the movable device is flying, the user may feel it most convenient to look at the movable device in a front-top direction which is between the top direction, i.e., upward, and the front direction, i.e., forward, relative to the user. When the user is holding remote controller 100 and controlling a flying movable device such as a flying UAV, the user may feel most comfortable to hold portion 160 in a direction with axis 161 substantially parallel to a frontal plane of the user body, such that both front face 130 and the user are facing the movable device in the front direction relative to the user. Meanwhile, rear side 120 faces the user holding remote controller 100, i.e., rear side 120 faces the backward direction relative to the user. This is just a representation of one way the user holds remote controller 100 and operates the movable device that may be convenient for the user, and does not limit the direction of front face 130 and rear side 120 when the user is operating remote controller 100.

In some exemplary embodiments, remote controller 100 may be a somatosensory remote controller configured to receive user input through user control of the movement of the remote controller. The user may find it particularly convenient to hold portion 160 of somatosensory remote controller 100 in a vertical direction such that top-bottom axis 161 of portion 160 is also in a vertical direction, i.e., normal to the ground, or at least holding in the vertical direction as an initial direction before rotating remote controller 100, because this is parallel to the top-bottom direction of the user body and therefore intuitive for benchmarking.

In some exemplary embodiments, when the user is holding portion 160 in the vertical direction, which is substantially parallel to a frontal plane of the user body, and controlling a movable device in the front direction or front-top direction relative to the user, the antenna of remote controller 100 faces substantially towards the movable device so that a signal from the antenna can be effectively received by the movable device. In FIGS. 1A and 1B, antenna portion 180 includes the antenna of remote controller 100, extending further forward than top portion 170 to form an angle 152 with top portion 170. This enables the antenna to face substantially towards the movable device and reduces loss of antenna signal caused by being blocked by other parts of remote controller 100. In some exemplary embodiments, angle 152 may be an acute angle. In some exemplary embodiments, angle 152 may be a right angle or an obtuse angle. As used herein, an obtuse angle is greater than 90 degrees and less than 180 degrees. In some exemplary embodiments, when the movable device is a UAV, angle 152 is acute because it better enables the antenna to face towards the flying UAV in the front-top direction when the user is standing on the ground and holding handheld portion 150 vertically. Another advantage of arranging antenna portion 180, including the antenna, to extend further forward than top portion 170 is to arrange the antenna away from electronic components of remote controller 100 so that interference among the electronic components and the antenna can be reduced. For example, a power supply is located in portion 160 and is separated from the antenna by top portion 170 such that the interference between the antenna and the power supply can be reduced. Similarly, antenna portion 180 may include a compass housed therein so that the compass can be arranged away from electronic components of remote controller 100, thereby reducing electrical interference to the compass.

Remote controller 100 includes one or more control components on first side 110. As shown in FIG. 1A, remote controller 100 includes a control component 112 extended from through-hole 1121 on first side 110 of top portion 170. Control component 112 may be a movable control switch. Control component 112 is configured to receive user input for operating the movable device. In some exemplary embodiments, the movable device may include at least one midcourse task device capable of conducting midcourse tasks when the movable device is moving. The at least one midcourse task device may include a part of the movable device or a load carried by the movable device. Control component 112 may be configured to control the part of the movable device or the load. For example, the movable device may be a robot and the at least one midcourse task device may be a mechanical arm of the robot, and control component 112 may be further configured to control the mechanical arm to wave when the robot is walking. In some exemplary embodiments, the movable device is a UAV, component 112 may be configured to control the UAV to conduct in-flight activities by controlling the at least one midcourse task device. For example, the at least one midcourse task device may include a gimbal of the UAV. The gimbal may be configured to allow the load carried by the gimbal to rotate about one or more axes, control component 112 may be configured to control the rotation of the load, including adjusting the pitch angle of the load.

Figure 1C:
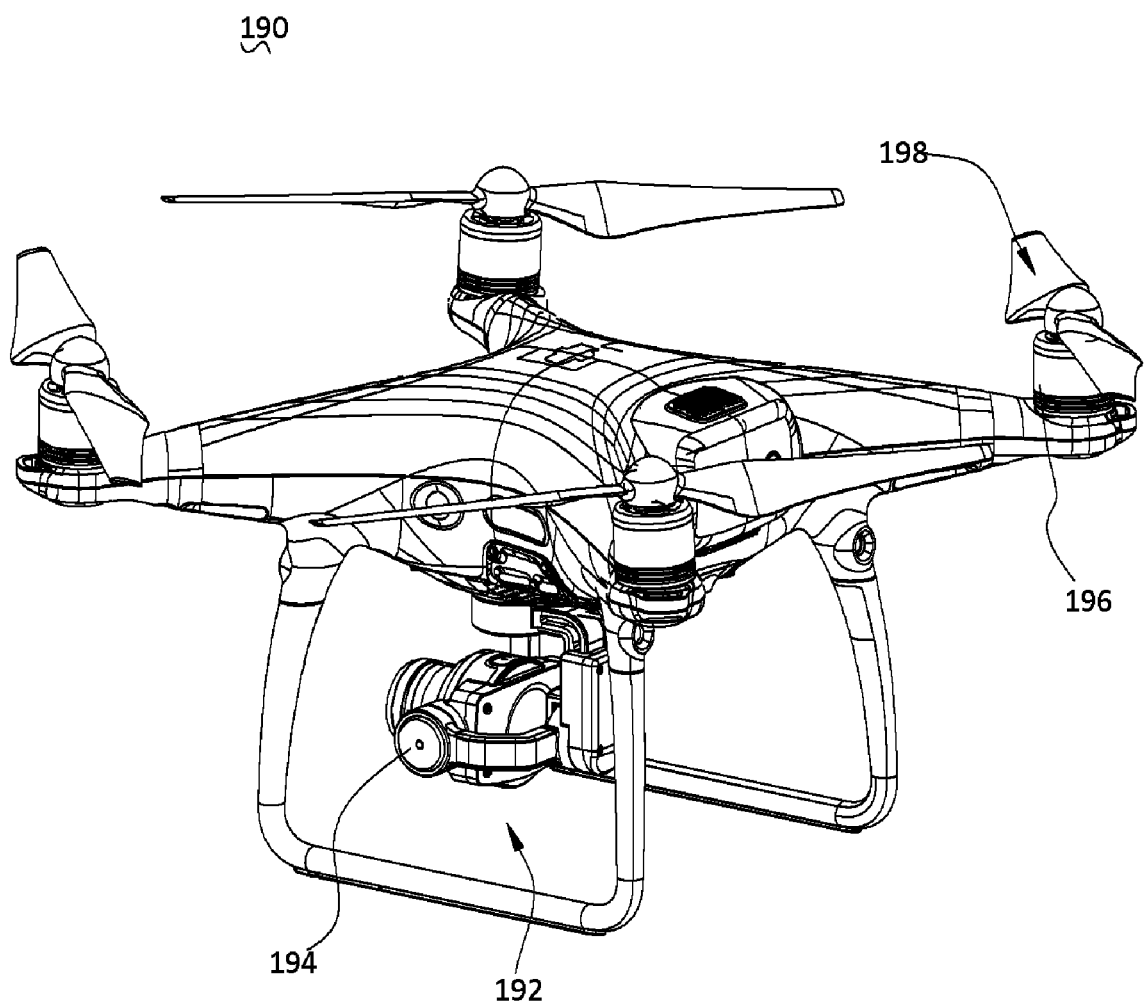
FIG. 1C shows an exemplary unmanned aerial vehicle (UAV) according to some exemplary embodiments of the present disclosure.

FIG. 1C shows an exemplary UAV 190 according to some exemplary embodiments of the present disclosure. Control component 112 may be configured to control movements of a gimbal 192. For example, when control component 112 is pushed in a direction away from holding portion 160, a motor 194 may operate to move towards a first direction; and when control component 112 is pulled in a direction towards holding portion 160, motor 194 may operate to move towards a second direction. The first direction may be opposite to the second direction. For example, the first direction may be a counterclockwise direction, and the second direction may be a clockwise direction. Alternatively, the first direction may be a clockwise direction, and the second direction may be a counterclockwise direction.

In some exemplary embodiments, when control component 112 is no longer being pushed or pulled, control component 112 may be configured to return to an initial position. The initial position may be where control component 112 was before being pushed or pulled. The initial position of control component 112 may be a middle position in through-hole 1121. Accordingly, when control component 112 is no longer being pushed or pulled, control component 112 is configured to return to the middle position of through-hole 1121. Thus, control component 112 may be automatically reset to the initial position and ready for a next control operation intended by a user, which improves convenience of remote controller 100.

As shown in FIG. 1A, remote controller 100 includes a control component 114 on first side 110. Similar to control component 112, control component 114 is configured to receive user input for operating the movable device. Control component 114 may be further configured to control a midcourse device of the movable device or the load to conduct midcourse tasks. In some exemplary embodiments, the movable device may be a UAV. Component 114 may be configured to control the gimbal or the load to conduct in-flight activities when the UAV is flying. For example, the load may include a sensing device. The sensing device may include an imaging sensor configured to collect data used to generate images or videos. In some exemplary embodiments, control component 114 is configured to control the imaging sensor to take images and/or videos. For example, control component 114 may be a button configured for the user to press and hold it for a duration until the button is released. Whether the duration of the press-and-release is longer or shorter than a predetermined threshold determines whether the press-and-release is a user input for photo taking or video taking. For example, control component 114 can be configured to control the imaging device to take a photo when the duration of a press-and-release of control component 114 is shorter than the predetermined duration threshold, and configured to control the imaging device for video taking when the duration of the press-and-release of control component 114 is longer than the predetermined duration threshold.

In some exemplary embodiments, the load includes a sprayer. The sprayer associated with the load may include devices for storing and spraying pesticides. Control component 114 may be configured to control the sprayer to conduct in-flight activities including spraying pesticides.

Referring to FIG. 1B, remote controller 100 includes a control component 121 on rear side 120. In some exemplary embodiments, remote controller 100 also includes control components 122 and 123 on rear side 120. Control components 121, 122, and 123 are configured to control the movement of the movable device. For example, control component 121 may be configured to receive user input of settings related to the movement control or moving mode of the movable device. As another example, control component 122 may be configured to control locking and unlocking of the movable device. As another example, control component 123 may be configured to control the braking of the movable device.

In some exemplary embodiments in which the movable device is a UAV, control component 121 may be configured to control the flying mode of the UAV. Control component 122 may be configured to control locking and unlocking of the UAV. The locking of the UAV is to control the UAV to be in a locked state. The unlocking of the UAV is to control the UAV to be in an unlocked state. In the locked state of the UAV, a rotor-blade assembly of the UAV may, for example, be prevented from rotating. In the unlocked state of the UAV, the rotor-blade assembly of the UAV may, for example, be allowed to rotate. Control component 123 may be configured to control the braking of the UAV. For example, control component 123 may be a button configured to receive a user input whenever the user presses control component 123. When control component 123 receives a user input, control component 123 may control the UAV to reduce its flying speed.

Remote controller 100 includes a control component 131 on front face 130. In some exemplary embodiments, control component 131 is a trigger and includes a trigger arm 132. In some exemplary embodiments, control component 131 is configured to control the movement of the movable vehicle or the rotating speed of the one or more motors of the movable vehicle. Control component 131 provided as a trigger is described in more detail with reference to FIGS. 3A and 3B as a trigger 300.

Ease of control and comfort when handling is also an aspect of remote controllers. Single-handheld remote controllers are advantageous in this regard, and can also free one hand of a user to do other tasks when the other hand is handling the controller. In some exemplary embodiments, remote controller 100 is configured to be held by a single hand of the user and receive user input from the single hand. In some exemplary embodiments, remote controller 100 is configured to be a suitable size and shape so that the user can comfortably hold remote controller 100 at handheld portion 150. For example, as shown in FIGS. 1A and 1B, remote controller 100 is further configured in such a way that the user can hold portion 160 by the palm and fingers of the single hand. In some exemplary embodiments, remote controller 100 is configured in such a way that control components on top portion 170 can receive user input from at least the thumb of the single hand holding portion 160. In some exemplary embodiments, handheld portion 150 is configured in such a way that control components on top portion 170 can receive user input from at least the thumb and index finger of the single hand holding portion 160.

In some exemplary embodiments, when the user is holding and operating remote controller 100 with a single hand, the user does not need to stretch the thumb and other fingers too much to operate the control components on remote controller 100. It may be comfortable for the user to operate remote controller 100 if the control components, or at least those frequently used control components, are within a small distance from a natural resting position of the thumb and/or other fingers when the user is holding remote controller 100. For example, the user may find it comfortable to hold remote controller 100 at handheld portion 150 with the thumb resting on first side 110 and the index finger resting on third side 130. The user may find it particularly comfortable with the thumb resting on first side 110 of top portion 170. In some exemplary embodiments, the one or more control components on first side 110, such as control components 112 and 114, are configured to receive user input from the thumb of the user. Control components 112 and 114 are further configured to receive user input for operating the movable device. In some exemplary embodiments, control component 131 is configured to receive input from the index finger of the user. In some exemplary embodiments, control components 121, 122, and 123 may be configured to receive input from the thumb of the user.

As explained above, in some exemplary embodiments, remote controller 100 may be a somatosensory remote controller configured to receive user input through user control of the movement of the remote controller (i.e., somatosensory control). The somatosensory remote controller may be configured to make it more convenient for the user to control the movable device. One reason is that the movement of the somatosensory remote controller may be easier to understand by the user, because the movement of somatosensory remote controller has an intuitive connection with the type of corresponding user command. For example, remote controller 100 may be configured to control the movable device to move forward when the user moves or rotates remote controller 100 forward. As another example, remote controller 100 may be configured to control the movable device to move towards the left when the user moves remote controller 100 towards the left. The user may find such somatosensory control easier to understand than trying to make sure he/she is pressing/manipulating the correct control components. By enabling the user to send certain user commands through simply moving the remote controller, the somatosensory remote controller may also simplify the control components at least to the extent that the number of the control components or mechanisms that fingers need to operate is reduced.

However, when fingers move on remote controller 100 and operate the control components, such movement and operation might interfere with the somatosensory control. For example, if the thumb moves from a natural resting position on first side 110 to operate control component 123 on rear side 120, the movement of the thumb may cause movement of the hand and even wrist, which may in turn shake remote controller 100. In such a case, the somatosensory remote controller may mistakenly receive this undesired shaking movement as a user input to control the movable device.

This problem may be more serious when user control of midcourse tasks interferes with the somatosensory control when the movable device is moving as compared to interference that takes place when the movable device is motionless or moving at a low speed. For example, if control components on first side 110 and rear side 120 are configured to receive user input for controlling in-flight activity of the UAV when the UAV is flying, the shaking movement caused by fingers moving between first side 110 and rear side 120 may be mistakenly received by the somatosensory remote controller as a user input for making a turn. This may not only cause undesired movement in the UAV but also be dangerous. As another example, pressing a button on rear side 120 by the thumb may cause remote controller to rotate forward, which causes another type of undesired movement of the somatosensory remote controller. In some exemplary embodiments, to address this interference problem, the control components controlling midcourse tasks or receiving high frequency user inputs may be arranged on the side where the thumb naturally rests in order to cause the least unwanted movement to remote controller 100 when operating. In some exemplary embodiments, first side 110 is the side of the exemplary remote controller to place control components controlling midcourse tasks or receiving high frequency user inputs considering the interference problem. This is because if the right hand is holding remote controller 100, the thumb naturally rests on first side 110, and the thumb's operation on first side 110, such as pressing, may cause the least movement to remote controller 100 since the hand is still in the grasping gesture, as compared to stretching the thumb (or other finger(s)) away to rear side 120 or even farther to second side 140.

In some exemplary embodiments, the above factors in favor of having midcourse task and/or frequently used control components on first side 110 may be considered with other factors. For example, although it may be less favorable to place midcourse control components on rear side 120 than on first side 110 due to the above-described shaking problem, there may be a need not to put all control components on first side 110 for reasons such as limited surface area of first side 110 and to reduce chances of accidental touching of other control components if too many control components are on the same side. Rear side 120 may be more favorable than second side 140 for placing control components considering the fact that rear side 120 is closer to first side 110. As another example, it may be desirable for some control components (such as power switch, braking button, etc.) to be located far from the most frequently operated control components on remote controller 100 or the resting position of the thumb, such that the user could not easily touch any of these control components accidentally. In some exemplary embodiments, it may be more favorable to place more frequently used control components on rear side 120 than on second side 140. In some exemplary embodiments, it may be more favorable to place control components controlling midcourse activities on rear side 120 than on second side 140. In some exemplary embodiments, remote controller 100 includes a control component 141 on second side 140. For example, control component 141 may be a power switch. The power switch is a less frequently used control component than most, if not all, control components. In fact, the user may try not to accidentally touch the power switch when controlling midcourse activities when the movable device is moving. Therefore it may be more favorable to place the power switch on second side 140 such that the power switch is positioned away from control components the user operates more frequently.

In some exemplary embodiments, the movable device is a vehicle and control component 141 is configured to receive user input for the movable device only suitable when the movable device is motionless or moving at a low speed. For example, control component 141 may be the power switch. It is only suitable to turn off the movable device when the movable device is motionless or moving at a low speed. This is because when the movable device is moving quickly, it is dangerous to turn off the movable device, which may cause harm. As another example, control component 141 may be configured to control locking and unlocking of the movable device. Similarly, for safety reasons it is only suitable to lock the motors driving the movable device when the movable device is motionless or moving at a low speed.

In some exemplary embodiments, remote controller 100 includes control component 123 configured to control the braking of the movable device on the side of second side 140 that is farther from the resting position of the thumb. For example, if remote controller is configured for a right hand to hold and the resting position of the thumb is on first side 110, control component 123 is positioned on the right side of rear side 120. In some exemplary embodiments, remote controller 100 includes a protrusion between control component 123 and the other control components to the left of it, i.e., components 121 and 122, on rear side 120 to prevent the thumb from accidentally touching control component 123. For example, remote controller 100 may include a protrusion 125 between control component 123 and control components 121 and 122 on rear side 120. As shown in FIG. 1C, control component 123 may be configured to control the braking of UAV 190. When control component 123 is actuated at a first time, a control of UAV 190 by remote controller 100 may be disabled. When control component 123 is actuated for a second time, the control of UAV 190 by remote controller 100 may be enabled. When the control by remote controller is enabled, a current state of remote controller 100 may be a default state of the control of UAV 190. Alternatively, when control component 123 is actuated again, the default state of the control may be a preset state regardless of the current state of remote controller 100.

Figure 2A:
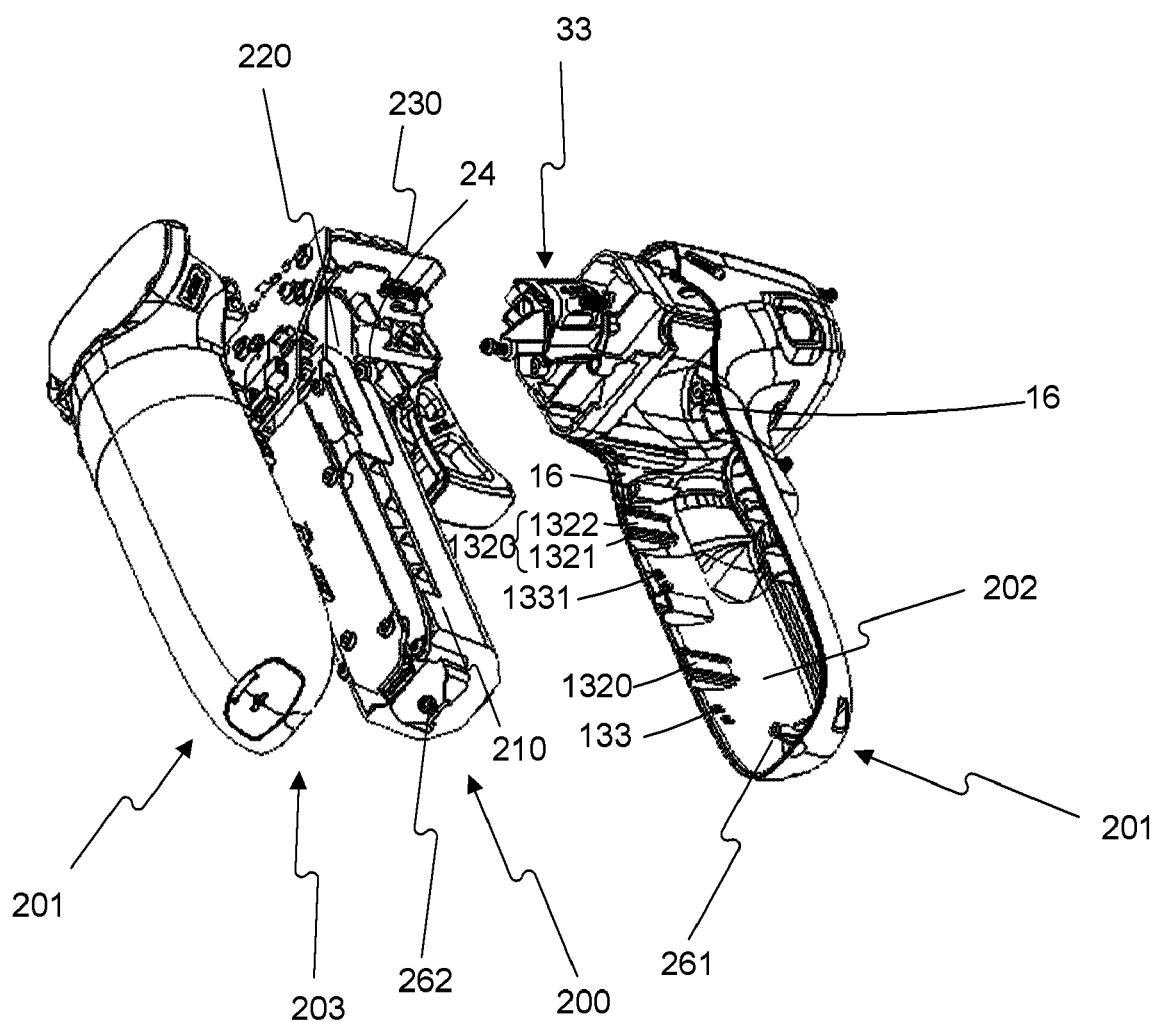
FIG. 2A shows an exploded view of the exemplary remote controller according to some exemplary embodiments of the present disclosure.
Figure 2B:
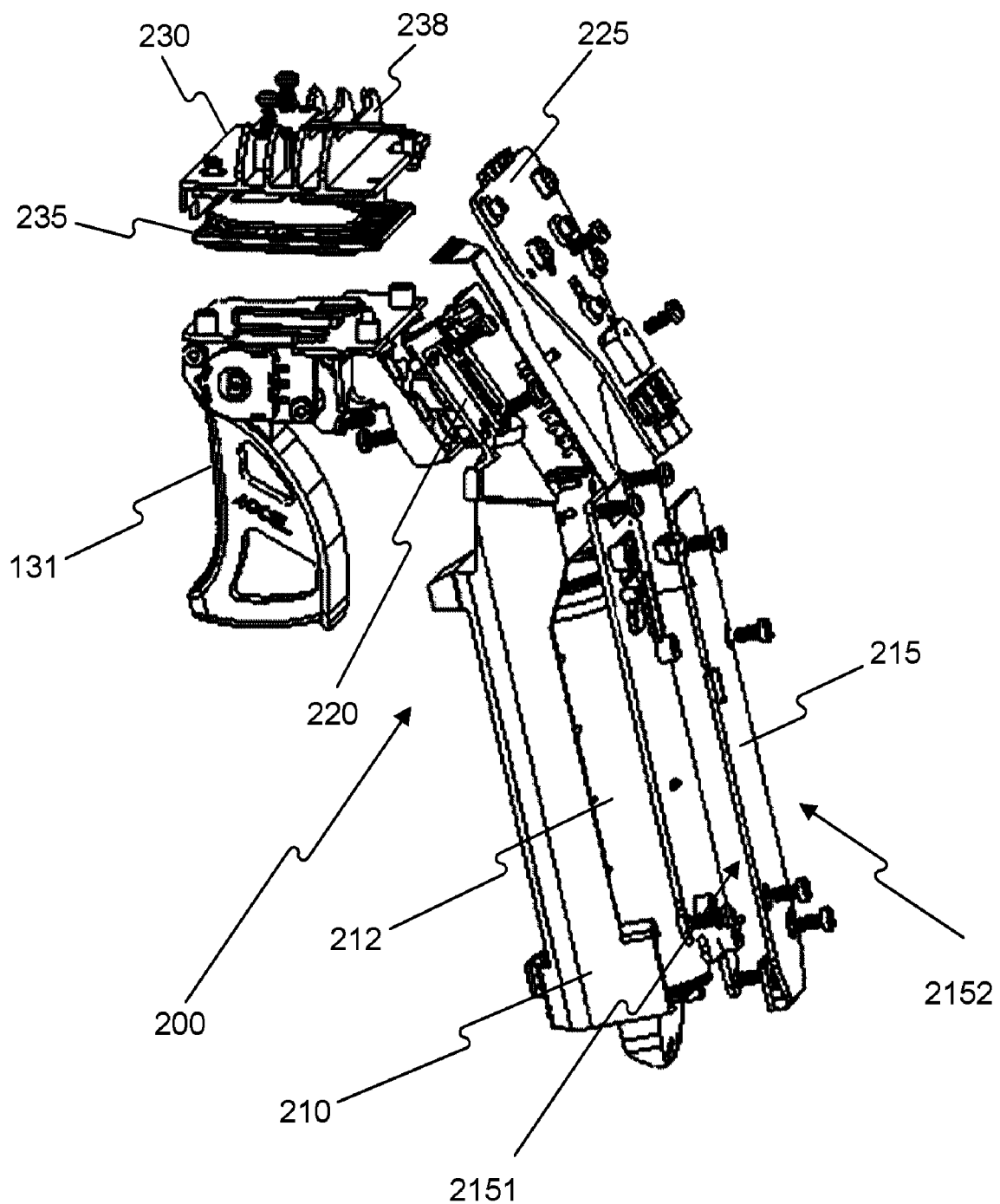
FIG. 2B shows an exploded view of components of the exemplary remote controller according to some exemplary embodiments of the present disclosure.
Figure 2C:
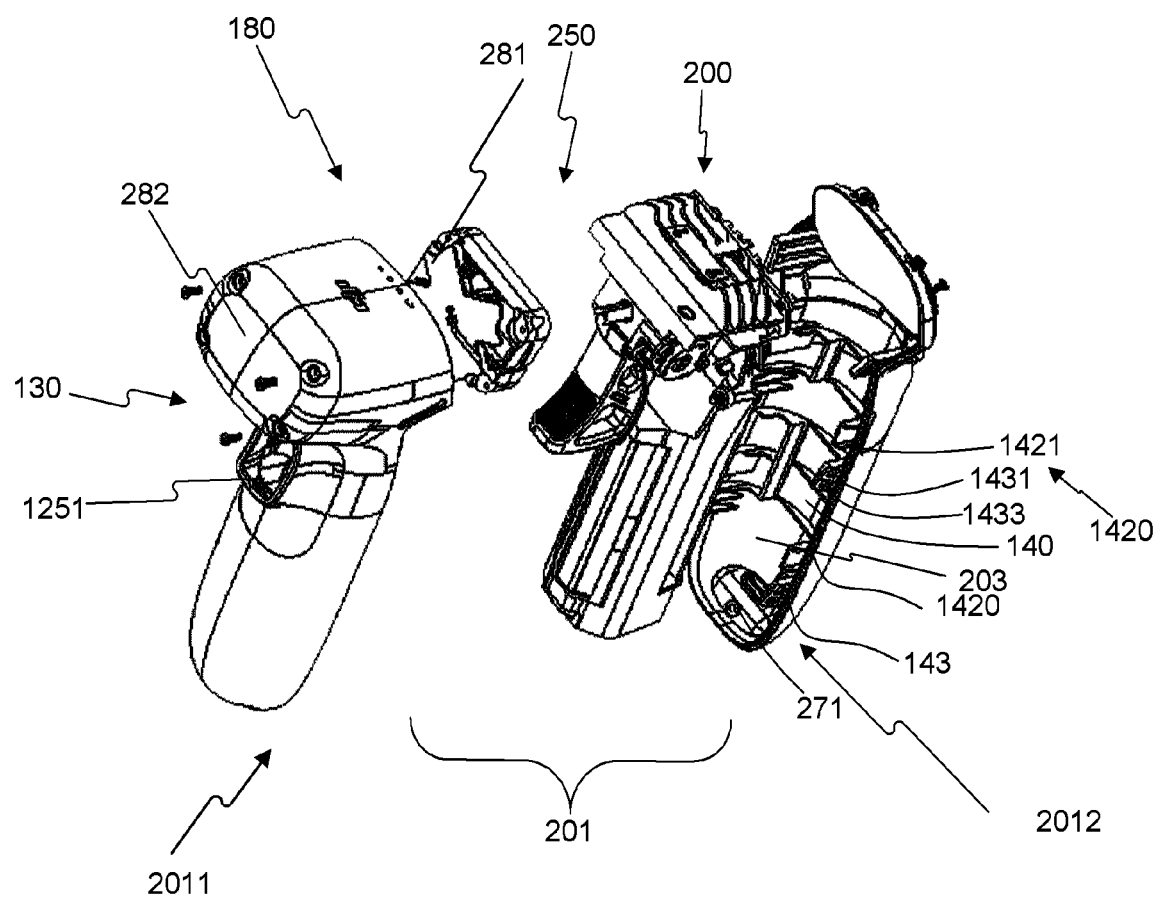
FIGS. 2C and 2F show further exploded views of the exemplary remote controller according to some exemplary embodiments of the present disclosure.
Figure 2D:
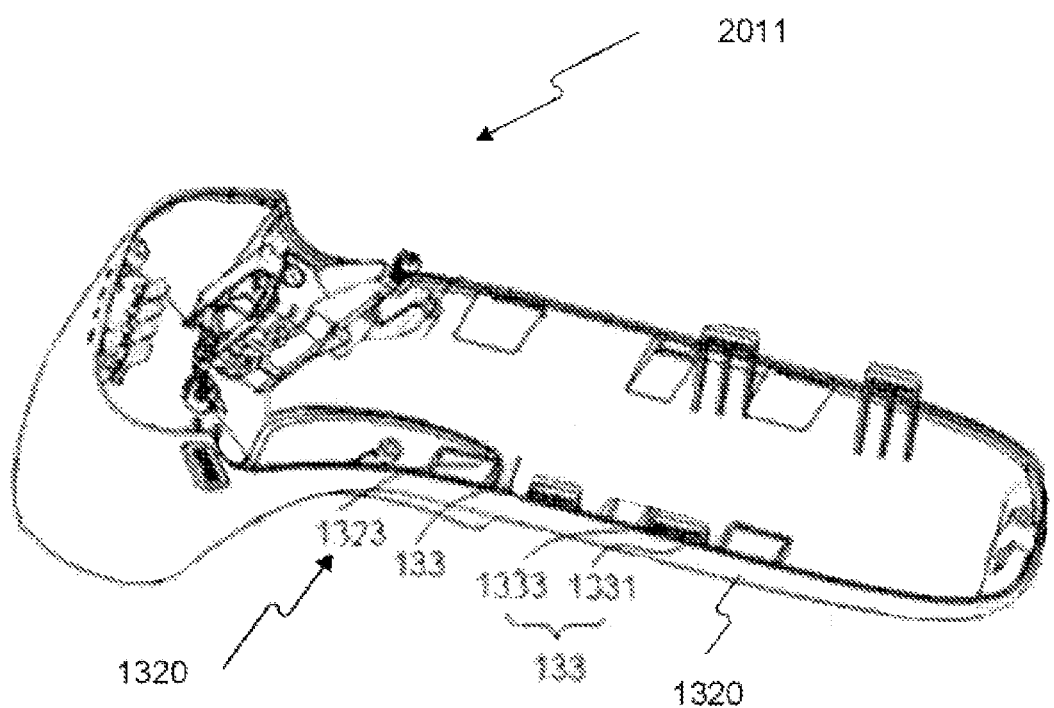
FIG. 2D shows further details of a first outer shell of the exemplary remote controller according to some exemplary embodiments of the present disclosure.
Figure 2E:
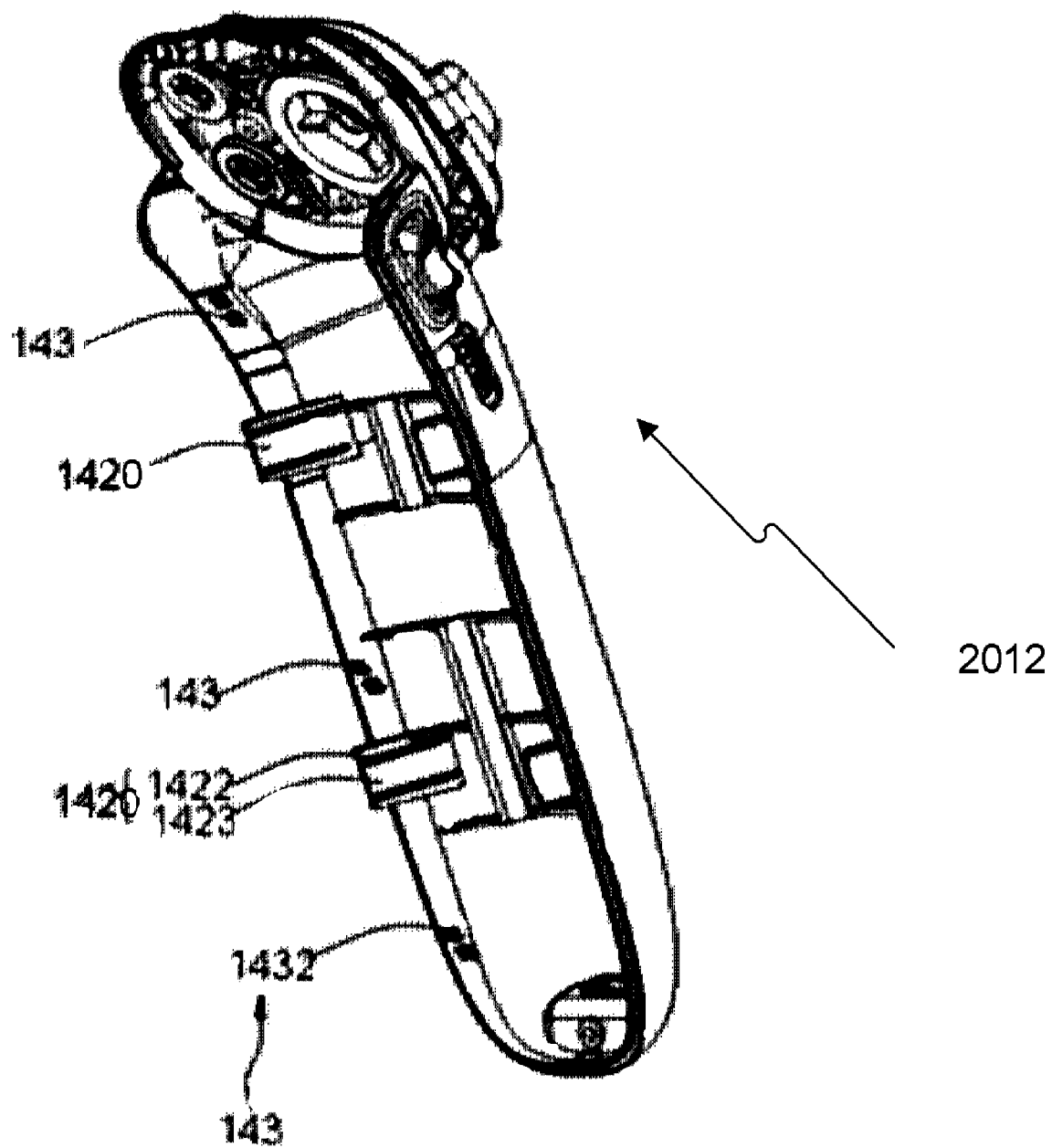
FIG. 2E shows further details of a second outer shell of the exemplary remote controller according to some exemplary embodiments of the present disclosure.
Figure 2F:
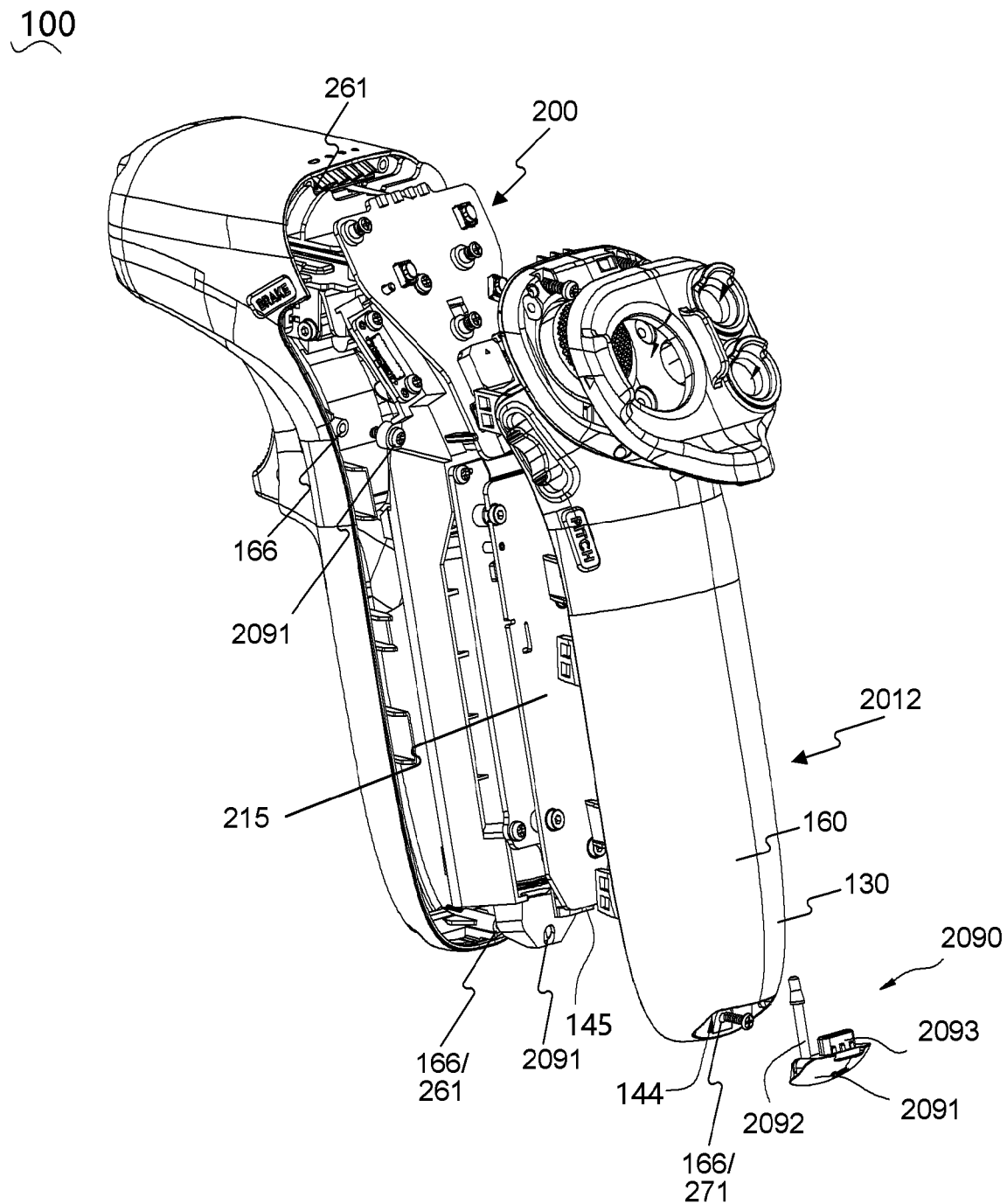

FIGS. 2A, 2C, and 2F show exploded views of exemplary remote controller 100 according to some exemplary embodiments of the present disclosure. FIG. 2B shows an exploded view of components of exemplary remote controller 100 according to some exemplary embodiments of the present disclosure with reference to FIG. 2A. FIGS. 2D and 2E respectively show details of a first outer shell 2011 and a second outer shell 2012 of exemplary remote controller 100 according to some exemplary embodiments of the present disclosure. In some exemplary embodiments, remote controller 100 includes a bracket 200 where various components and substructures of remote controller 100 may be disposed. Bracket 200 is directly or indirectly fixed to an outer shell 201 of remote controller 100. Bracket 200 is substantially located within outer shell 201 such that components and substructures of remote controller 100 disposed on bracket 200 can be fully disposed in the internal space of remote controller 100. This is advantageous especially for small size remote controllers because the efficient use of the internal space enables the small size remote controllers to have more components.

The disclosed exemplary embodiments related to bracket 200 are not necessarily limited in their application to the details of construction and the arrangement of the components of remote controller 100 set forth herein with respect to and/or illustrated in the drawings and/or the examples. The disclosed exemplary embodiments may have variations, or be practiced or carried out in various ways. For example, outer shell 201 may function or partially function as bracket 200 such that components and substructures of remote controller 100 may be disposed on outer shell 201. In some exemplary embodiments, remote controller 100 does not include bracket 200 and outer shell 201 functions as bracket 200 as described according to some exemplary embodiments of the present disclosure. For example, the antenna and circuit boards of remote controller 100 may be disposed on internal sides 202 and 203 of outer shell 201. The antenna may be disposed on the top-front end of internal side 202 of a front face portion of outer shell 201. Circuit boards may be disposed on internal side 203 of a rear side portion of outer shell 201 as shown in FIG. 2C. As another example, the antenna and control components of remote controller 100 may be disposed directly on external sides of outer shell 201 and connected with the circuit boards inside outer shell 201 via connection circuits disposed on outer shell 201.

Referring to FIG. 2C, outer shell 201 includes first outer shell 2011 and second outer shell 2012. First outer shell 2011 and second outer shell 2012 may be assembled separably to form an enclosure 250.

Referring back to FIG. 1A, through-hole 1211 or "a first through-hole 1211" hereafter is disposed on first side 110 of top portion 170 on second outer shell 2012. Alternatively, in some exemplary embodiments, first through-hole 1211 may instead be disposed on first side 110 of top portion 170 on first outer shell 2011.

Referring to FIG. 2C, a second through-hole 1251 is disposed on third side 130 of top portion 170 of first outer shell 2011.

Referring back to FIG. 1B, a third through-hole 1411 is disposed on second side 140 of top portion 170 of first outer shell 2011. Alternatively, in some exemplary embodiments, third through-hole 1411 may be instead disposed on second side 140 of top portion 170 of second outer shell 2012.

As shown in FIG. 1B, a fourth through-hole 1221 is disposed on rear side 120 of top portion 170 of second outer shell 2012.

As shown in FIG. 2A, a protrusion 261 is disposed on internal side 202 of of first outer shell 2011. Correspondingly, as shown in FIG. 2C, an assembly component 271 corresponding to protrusion 261 (in FIG. 2A) is disposed on internal side 203 of second outer shell 2012. Protrusion 261 and assembly component 271 are configured to connect first outer shell 2011 and second outer shell 2012. For example, in some exemplary embodiments, protrusion 131 may include a protrusion with a screw opening, and assembly component 271 may include a through-hole and a lock fastener. The lock fastener may pass through the through-hole of assembly component 271 and be fastened in the screw hole of protrusion 131 such that first outer shell 2011 and second outer shell 2012 may be assembled separately. Outer shell 201 can be opened to replace broken components and a battery, therefore maintenance may be made easier and usage life expectancy of remote control 100 extended.

Referring to FIG. 2A, in some exemplary embodiments, first guides 1320 are disposed on internal side 202 of first outer shell 2011. As shown in FIG. 2C, second guides 1420 corresponding to first guides 1320 are disposed on internal side 203 of second outer shell 2012. First guides 1320 may be moved along with second guides 1420 to guide an assembly direction of first outer shell 2011 and second outer shell 2012, thereby facilitating assembly of first outer shell 2011 and second outer shell 2012.

In some exemplary embodiments, first guide 1320 includes two rails 1321 and a gliding surface 1322 defined between rails 1321. Correspondingly, second guide 1420 includes a guiding part 1421 movable on gliding surface 1322 between rails 1321. Alternatively, guiding part 1421 may be disposed enclosing two rails 1321 in a movable manner such that first guide 1320 is movable along second guide 1420.

In some exemplary embodiments, as shown in FIG. 2D, first guide 1320 includes a guiding part 1323. Correspondingly, as shown in FIG. 2E, second guide 1420 includes two rails 1422 and a gliding surface 1423 defined between rails 1422. Guiding part 1323 is movable on gliding surface 1423 between two rails 1422. Alternatively, guiding part 1323 may be disposed enclosing two rails 1422 in a movable manner such that first guide 272 may be movable along second guide 142.

In some exemplary embodiments, first guide 1320 may include a plurality of guides such as two, four, six, eight, or more guides. The plurality of first guides 1320 may be disposed symmetrically on two sides on internal side 202 of first outer shell 2011. Similarly, second guide 1420 may also include a plurality of guides such as two, four, six, eight, or more guides. The plurality of second guides 1420 may be disposed symmetrically on two sides on internal side 203 of second outer shell 2012. When first outer shell 2011 and second outer shell 2012 are assembled, aligning first guides 1320 on one side of internal side 203 of first outer shell 2011 with corresponding second guides 1420 of second outer shell 2012 may facilitate aligning first guides 1320 on the other side of internal side 203 of first outer shell 2011 with corresponding second guides 1420 of second outer shell 2012. Such a configuration makes it easier and faster to assemble first outer shell 2011 and second outer shell 2012.

Referring back to FIG. 2A, first limiting parts 133 are disposed on internal side 202 of first outer shell 2011. Correspondingly, referring back to FIG. 2C, second limiting parts 143 corresponding to first limiting parts 133 are disposed on internal side 203 of second outer shell 2012. First limiting parts 133 and second limiting parts 143 are configured to jointly restrict relative movement between first outer shell 2011 and second outer shell 2012 for fixed connection between first outer shell 2011 and second outer shell 2012. Such restriction of relative movement is intended to prevent accidentally opening first outer shell 2011 and second outer shell 2012 during use of remote control 100.

In some exemplary embodiments, first limiting part 133 includes a block 1331 and second limiting part 143 includes a limiting component 1431 with an opening 1433. Block 1331 is configured to matingly fit opening 1433. Block 1311 can thereby fixed with opening 1433 such that first outer shell 2011 and second outer shell 2012 may not move relative to each other when first outer shell 2011 and second outer shell 2012 are assembled together.

In some exemplary embodiments, as shown in FIGS. 2D and 2E. First limiting part 133 may include a block 1331 with an opening 1333 and second limiting part 143 includes block 1432. Block 1432 is configured to matingly fit opening 1333. Block 1432 can thereby be fixed with opening 1333 such that first outer shell 2011 and second outer shell 2012 may not move relative to each other when first outer shell 2011 and second outer shell 2012 are assembled together.

In some exemplary embodiments, first limiting part 133 may include a plurality of limiting parts such as two, four, six, eight, or more limiting parts. The plurality of limiting parts 133 may be disposed symmetrically on two sides of internal side 202 of first outer shell 2011. Similarly, second limiting part 143 may include a plurality of limiting parts such as two, four, six, eight, or more limiting parts. The plurality of limiting parts 143 may be disposed symmetrically on two sides of internal side 203 of second outer shell 2012. Such configuration may restrict relative movement between first outer shell 2011 and second outer shell 2012.

In some exemplary embodiments, as shown in FIG. 2A and FIG. 2C, first guides 1320 and first limiting parts 133 may be disposed alternatingly on each side of internal side 202 of first outer shell 2011. Similarly, second guides 1420 and second limiting parts 132 may be disposed alternatingly on each side of internal side 203 of second outer shell 2012. When first outer shell 2011 is assembled with second outer shell 2012, relative movement between first guides 1320 and second guides 1420 may be prevented to avoid leaving any crack between first outer shell 2011 and second outer shell 2012 through which dust may enter the interior of remote controller 100.

Referring to FIG. 2F, a through groove 144 is disposed on third side 130 of holding portion 160 of second outer shell 2012. A connecting end 145 is exposed via through groove 144. A peripheral device (not shown) may be connected with components inside remote control 100 via connecting end 145. For example, the peripheral device may be electrically connected with a power source disposed inside remote control 100 for providing electricity to the power source. In another example, the connection between the peripheral devices may be for data transfer.

In some exemplary embodiments, first assembly component 166 is disposed on outer shell 201 to connect bracket 200 and outer shell 201. First assembly component 166 is disposed on at least one of internal side 202 of first outer shell 2011 or internal side 203 of second outer shell 2012. First assembly component 166 may be disposed on internal side 202 of first outer shell 2011 for connecting first outer shell 2011 and bracket 200. First assembly component 166 may be disposed on internal side 203 of second outer shell 2012 for connecting second outer shell 2012 and bracket 200. First assembly component 166 may be disposed on both internal side 202 of first outer shell 2011 and internal side 203 of second outer shell 2012 to connect outer shell 201 and bracket 200.

In some exemplary embodiments, protrusion 261 on first outer shell 2011 and first assembly component 166 may at least partially be the same component. For example, protrusion 261 that is disposed on the bottom of internal side of first outer shell 2011 is referred to as first assembly component 166. Some protrusions 261 on first outer shell 2011 that are not the same components as first assembly component 166 may only be used with assembly component 271 on second outer shell 2012 to connect first outer shell 2011 and second outer shell 2012. Some protrusions 261 on first outer shell 2011 that are the same components as first assembly component 166 may not only be used with assembly component 271 on second outer shell 2012 to connect first outer shell 2011 and second outer shell 2012, but also be used to connect outer shell 201 and bracket 200. Specifically, assembly component 271 may be disposed on one side of through groove 144 on second outer shell 2012. Assembly component 271 may correspond to first assembly component 166 that is the same component as protrusion 261 on first outer shell 2011. A fastener may be configured to pass through assembly component 271 and bracket 200 to fasten protrusion 261 that is the same component of first assembly component 166. The fastener may be configured to connect first outer shell 2011, bracket 200, and second outer shell 2012 at the same time such that bracket 20 may be prevented from moving within enclosure 250 formed by first outer shell 2011 and second outer shell 2012.

As shown in FIG. 2F, bracket 200 is disposed in enclosure 250 of outer shell 201 and may be configured to fit outer shell 201. A second assembly component 2091 may be disposed on bracket 200. Second assembly component 2091 may be used with first assembly component 166 to connect outer shell 201 and bracket 200. Second assembly component 2091 may be positioned correspondingly to first assembly component 166.

With reference to FIG. 2B, in some exemplary embodiments, bracket 200 has a shape to fit with remote controller 100 such that bracket 200 is fully positioned within the internal space of remote controller 100. Thus bracket 200 and components disposed on bracket 200 can fully use the internal space of remote controller along the overall shape of remote controller 100. In some exemplary embodiments, bracket 200 is configured to accommodate angle 151 by including a bracket portion 210 inside portion 160 and a bracket portion 220 inside top portion 170. For example, in FIG. 2A bracket portion 220 extends further forward from bracket portion 210 and forms with bracket portion 210 an angle equal to or substantially equal to angle 151.

In some exemplary embodiments, bracket 200 is configured to accommodate angle 152 by including bracket portion 220 inside top portion 170 and a bracket portion 230 inside antenna portion 180. For example, in FIG. 2A, bracket portion 230 extends further forward from bracket portion 220 and forms an angle equal to or substantially equal to angle 152 with bracket portion 220.

In some exemplary embodiments, bracket 200 may only be directly or indirectly in contact with outer shell 201 at certain locations of bracket 200, with most portions of bracket 200 being out of contact from outer shell 201. This is advantageous because it reduces direct contact between electronic components (e.g., circuit boards, heat sinks, antennas, etc.) disposed on bracket 200 and outer shell 201, as compared with placing the electronics components directly on outer shell 201. Therefore, in some exemplary embodiments, some or all of the heat generated from the electronic components disposed on bracket 200 do not dissipate directly to outer shell 201 such that the temperature on outer shell 201 may be proper for a user to hold remote controller 100. For example, bracket portion 210 may be out of contact from outer shell 201 except being in contact with outer shell 201 through hole 262 in bracket 200 capable of receiving protrusion 261 on outer shell 201. A circuit board 215 may be disposed on bracket 210 and have little or no direct contact with outer shell 201, thereby reducing or eliminating direct heat transfer from circuit board 215 to outer shell 201. The electronic components are disposed on at least one of a first side 2151 or a second side 2152 of circuit board 215.

The longer bracket portions 210, 220, and 230 are, the more components may be disposed on bracket 200, and therefore more internal space of remote controller 100 may be available. In some exemplary embodiments, bracket portion 210 extends as great a length as allowed in the internal space of portion 160 to fully use of the internal space of remote controller 100. In some exemplary embodiments, bracket portion 210 extends the same length as portion 160 such that bracket portion 210 and components disposed on bracket portion 210 are fully positioned within the internal space of portion 160. For example, the components disposed on bracket portion 210 are located all over bracket portion 210 and use various portions of the internal space of portion 160, thereby better using the internal space of remote controller 100. As another example, as shown in FIG. 2B, a power supply 212 has the same length or nearly the same length of bracket portion 210 and is disposed on bracket portion 210. Circuit board 215 is also disposed on bracket 210 to better use the internal space of portion 160. It is to be understood that the disclosed exemplary embodiments are not necessarily limited in their application to the details of construction and the arrangement of the components set forth in the following description and/or illustrated in the drawings and/or the examples. The disclosed exemplary embodiments may have variations, or may be practiced or carried out in various ways. For example, when the components disposed on bracket portion 210 are fully located within the internal space of portion 160, it does not limit the components disposed on bracket portion 210 to occupy 100% of the internal space of portion 160. The components may be disposed on bracket portion 210 (or outer shell 201 when outer shell functions as bracket portion 210) such that a majority of the internal space may be efficiently occupied by the components rather than being empty. This provides the advantage that remote controller 100 can be designed as small as possible because of the efficient use of its internal space. This also does not limit electrical components of remote controller 100 to be only disposed on bracket 200. The components not disposed on bracket 200 may be disposed on other locations of remote controller 100, and may be electrically connected with one or more circuit boards disposed on bracket 200. For example, the antenna may be disposed outside outer shell 201 and electrically connected with one or more circuit boards disposed on bracket 200 and other electronic components of remote controller 100 via one or more circuits.

Similarly, in some exemplary embodiments, bracket portion 220 extends as great a length as allowed in the internal space of top portion 170 for better using the internal space of remote controller 100. In some exemplary embodiments, bracket portion 220 and components disposed on bracket portion 220 are fully located within an internal space of top portion 170. In some exemplary embodiments, bracket portion 230 extends as great a length as allowed in the internal space of antenna portion 180 to better use the internal space of remote controller 100. In some exemplary embodiments, bracket portion 230 and components disposed on bracket portion 230 are fully located within an internal space of antenna portion 180. In some exemplary embodiments, bracket 200 and components disposed on bracket 200 are fully located within an internal space of remote controller 100.

As shown in FIG. 2A, bracket 200 is configured to keep circuit board(s) of remote controller 100 from direct contact with outer shell 201. As shown in more details in FIG. 2B, in some exemplary embodiments, circuit board 215 is disposed on bracket portion 210. In some exemplary embodiments, circuit board 225 is disposed on bracket portion 220. Similar to circuit 215, electronic components may be disposed on at least one of first side or second side of circuit board 225. In some exemplary embodiments, a circuit board 235 is disposed on bracket portion 230. Similarly, electronic components may be disposed on at least one of first side or second side of circuit board 235.

Since bracket portion 230 is farthest from handheld portion 150, especially portion 160 of handheld portion 150 where the palm makes contact, among bracket portions 210, 220, and 230, it may be desirable to dispose the primary heat source(s) on bracket portion 230 so that user experience is enhanced by not feeling too much heat during use. The antenna is usually a primary heat source when remote controller 100 is in use. Therefore, it may be desirable to dispose the antenna at antenna portion 180 not only because of heat-related user experience but also because disposing the antenna at the front of remote controller 100 can help to reduce antenna signal loss caused by being blocked by other components of remote controller 100. It may therefore also be desirable to dispose heat dissipation components on bracket portion 230. For example, in FIG. 2B, a heat dissipation structure 238 including one or more heat dissipation components is disposed on bracket portion 230. In some exemplary embodiments, heat dissipation structure 238 includes at least one heat sink. In some exemplary embodiments, heat dissipation structure 238 includes one or more heat transfer components to transfer heat from bracket portion 210 and/or bracket portion 220 to the heat dissipation components at bracket portion 230.

In the case where there are some electronic components that are primary heat sources of remote controller 100 in addition to the antenna, it may be desirable to place such components to be remote from the palm and close to the heat dissipation components. In some exemplary embodiments, circuit board 235 is thermally connected with the at least one heat sink via heat dissipation structure 238.

In some exemplary embodiments, some or all of the control components of remote controller 100 each include a first end disposed on bracket 200 and a second end exposed through outer shell 201. Such control components may be buttons, switches, triggers, joysticks, and be configured to enable the user to send user commands through the second ends on remote controller 100 by fingers without looking at remote controller 100. For example, as shown in FIG. 2B, control component 131 has a first end connected to bracket portion 220 and a second end being a trigger body; as shown in FIGS. 1A and 1B, the trigger body is exposed from a hole in outer shell 201 so that the user can operate control component 131 by operating the trigger body exposed from outer shell 201.

In some exemplary embodiments, the control components of remote controller 100 each include a first end disposed on bracket 200 and a second end exposed through the portion of outer shell 201 that corresponds to top portion 170. For example, as shown in FIG. 1A, the second ends of the control components, such as the buttons for the user to press, are all on top portion 170.

With reference to FIG. 2C, remote controller 100 includes an antenna 281 in antenna portion 180. In some exemplary embodiments, antenna 281 is housed in antenna portion 180 by being disposed on bracket portion 230. Bracket 200 is configured to hold antenna 281 from direct contact with outer shell 201.

In some exemplary embodiments, bracket 200 is configured to leave a space behind antenna 281, thereby reducing loss of signal transmitted backward from antenna 281. For example, as shown in FIG. 2C, antenna 281 is housed in antenna portion 180 and attached to outer shell portion 282 at the front end of antenna portion 180, thereby leaving the space behind antenna 281. Although the movable device being controlled is at the front/forward or upward directions relative to antenna 281 when the user is operating remote controller 100, it is beneficial if signals transmitted from antenna 281 in the backward directions (including directly backward direction, and side backward directions such as left-backward, top-backward, etc.) may prevent signals from being absorbed by other components of remote controller 100, so that a dead angle for operating remote controller 100 is reduced. This is advantageous when remote controller 100 is a somatosensory remote controller because the user may need to rotate remote controller 100 so that the movable vehicle is temporarily in a backward direction from remote controller 100 and antenna 281.

In some exemplary embodiments, antenna 281 has an X shape. In some exemplary embodiments, the two arms configured in the X shape of antenna 281 are perpendicular to each other and of the same size.

With reference to FIG. 2F, in some exemplary embodiments, circuit board 215 is also configured to contain connecting end 145. Connecting end 145 may be configured to electrically connect power supply 212 and external power sources to charge power supply 212. Connecting end 145 may also be connected with a main controller for data exchange.

Referring to FIG. 2F, in some exemplary embodiments, remote controller 100 may further include a sealing member 2090 movably installed at the bottom of second outer shell 2012 to selectively seal or expose through-groove 144. Sealing member 2090 includes a sealing body 2091, a connecting column 2092 and a positioning block 2093. Connecting column 2092 is arranged on sealing body 2091, connecting column 2092 is configured to extend into receiving cavity 2315 (as shown in FIG. 3C) from through-groove 144 and may be connected to internal side 203 of second outer shell 2012. Connecting column 2092 may be configured to extend in different lengths from second outer shell 2012. Positioning block 2093 is disposed on sealing body 2091, and positioning block 2093 and connecting post 2092 are located on the same side of sealing body 2091. Positioning block 2093 may be used for plugging with connecting end 145. When remote controller 100 does not need to be connected to an external device, positioning block 2093 on sealing member 2090 may be plugged into connecting end 145 to prevent leaving any crack through which dust may enter the interior of remote controller 100.

Figure 3A:
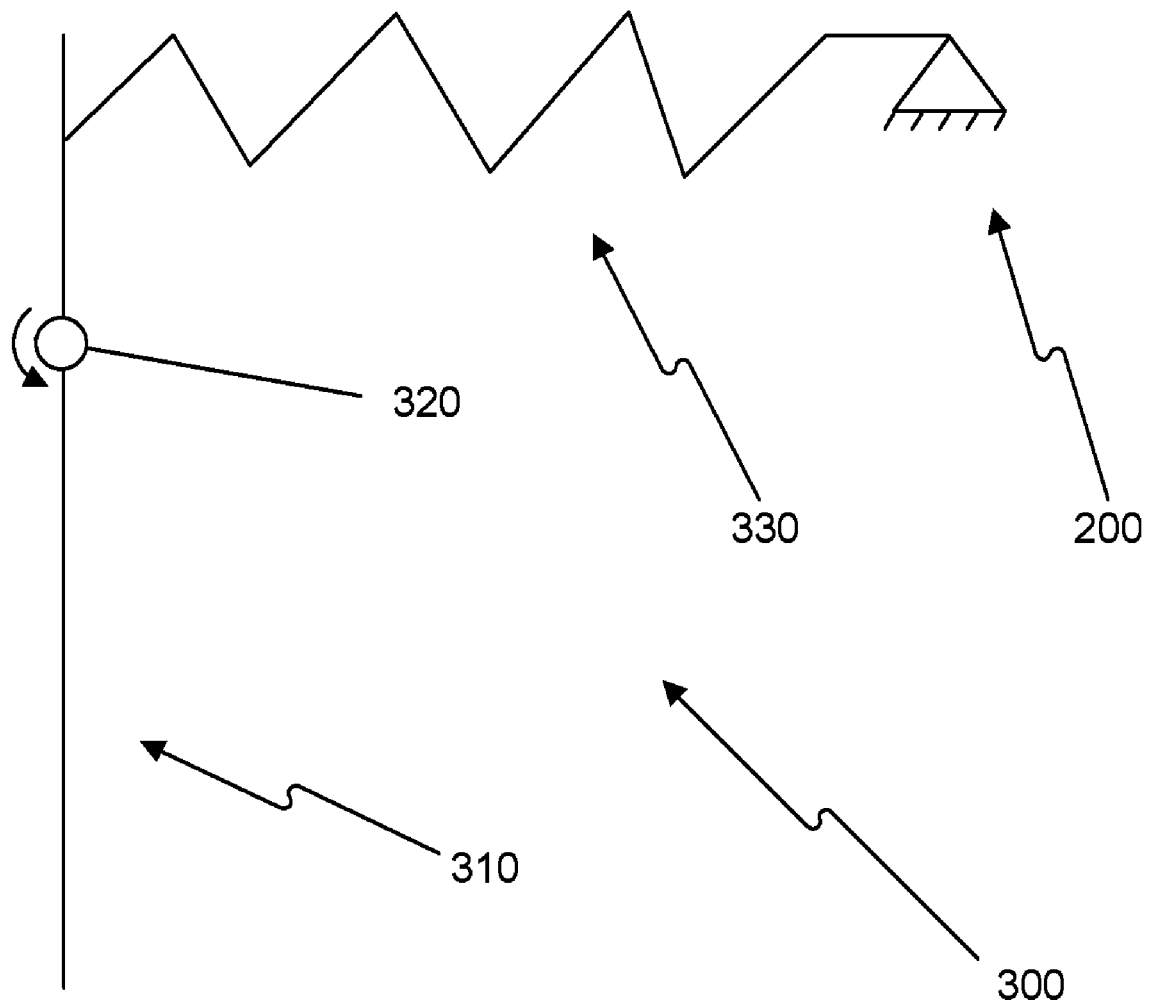
FIG. 3A shows a diagrammatic representation of the structure of an exemplary trigger according to some exemplary embodiments of the present disclosure.

FIG. 3A shows a diagrammatic representation of the structure of an exemplary trigger 300 according to some exemplary embodiments of the present disclosure. Trigger 300 includes a rotation portion 320 rotatable around a longitudinal axis of rotation portion 320 and a trigger arm 310 attached to rotation portion 320. For example, as shown in FIG. 3A, rotation portion 320 is a rod and is rotatable around the longitudinal axis of rotation portion 320 that is normal to the plane of FIG. 3A. Trigger arm 310 rotates together with rotation portion 320 such that the angular displacement of trigger arm 310 caused by its rotation is the same as the angular displacement of rotation portion 320 around the longitudinal axis of rotation portion 320.

In some exemplary embodiments, an elastic portion 330 is attached to trigger arm 310. Elastic portion 330 may include a spring (coil spring), a leaf spring, a rubber column, or other suitable device, or a combination thereof. For example, as shown in FIG. 3A, elastic portion 330 is a spring. Elastic portion 330 applies a restoring torque to trigger arm 310. For example, as shown in FIG. 3A, when trigger arm 310 rotates counterclockwise around rotation portion 320, elastic portion 330 applies a clockwise restoring torque to trigger arm 310. In some exemplary embodiments, the restoring torque is substantially proportional to an angular displacement of trigger arm 310. For example, the position shown in FIG. 3A may be an initial position of trigger arm 310. When trigger arm 310 rotates counterclockwise and away from the initial position, elastic portion 330 applies a restoring torque in the clockwise direction at a magnitude substantially proportional to a counterclockwise angular displacement of trigger arm 310. This means that if the user is pulling trigger arm 310, the user needs to exert a force which is also substantially proportional to the angular displacement of trigger arm 310 in order to pull trigger arm 310 further because the user force needs to overcome the restoring torque of elastic portion 330. In some exemplary embodiments, elastic portion 330 may be perpendicular to trigger arm 310 when trigger arm 310 is at the initial angular position shown in FIG. 3A. Elastic portion 330 may be substantially perpendicular to trigger arm 310 when the angular displacement is small.

In some exemplary embodiments, trigger 300 is a component of remote controllers for controlling the movable device according to some exemplary embodiments of the present disclosure. For example, remote controller 100 includes trigger 300 for controlling a UAV with one or more motors. Elastic portion 330 has a first end attached to bracket 200 of remote controller 100 and a second end attached to trigger arm 310.

In some exemplary embodiments, trigger 300 is configured to receive user input for controlling the rotating speed of the one or more motors of movable device. In some exemplary embodiments, trigger 300 is configured to receive the user input for controlling the rotating speed of the one or more motors to be related to the angular displacement of trigger arm 310. For example, trigger 300 is configured to receive the user input for controlling the rotating speed of the one or more motors to be substantially proportional to the angular displacement of trigger arm 310. This correlation between the angular displacement of trigger arm 310 and the rotating speed controlled based on the user input to trigger 300 can be linear, which is advantageous because the user can directly have a linear sense of the controlled motor speed.

In some exemplary embodiments, trigger 300 is configured to receive user input for controlling the movement speed of the movable device. In some exemplary embodiments, trigger 300 is configured to receive the user input for controlling the movement speed the movable device to be related (e.g., substantially proportional) to the angular displacement of trigger arm 310. In some exemplary embodiments, as noted above, the correlation between the angular displacement of trigger arm 310 and the movement speed controlled based on the user input to trigger 300 is linear, which is advantageous because the user can directly have a linear sense of the controller speed of the movable vehicle.

Figure 3B:
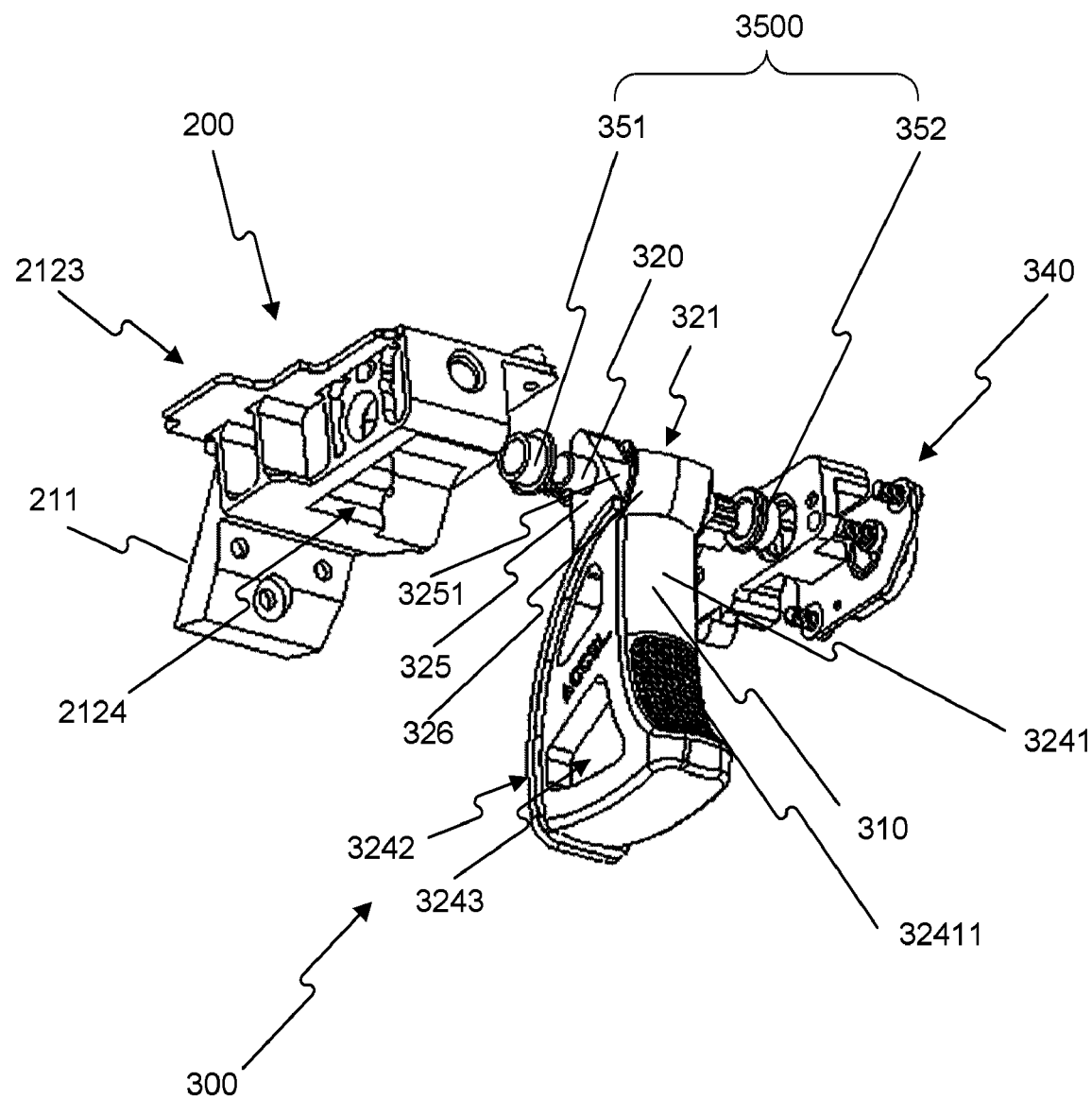
FIG. 3B shows an exemplary trigger according to some exemplary embodiments of the present disclosure.
Figure 3C:
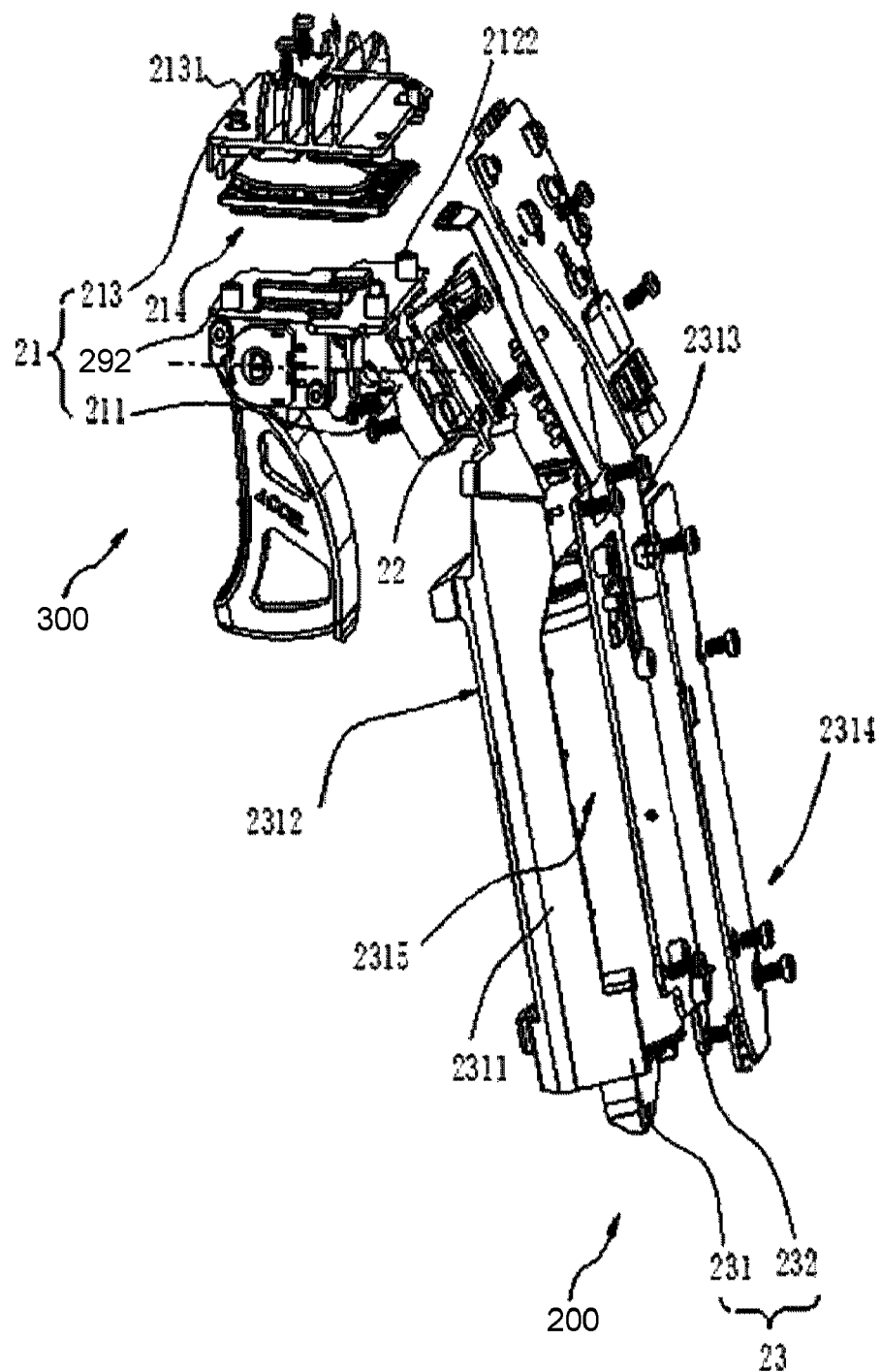
FIG. 3C shows an exploded view of an exemplary bracket according to some exemplary embodiments of the present disclosure.

FIG. 3B shows exemplary trigger 300 according to some exemplary embodiments of the present disclosure. In some exemplary embodiments, a remote control system may include a UAV and a remote controller such as remote controller 100 for controlling the UAV according to some exemplary embodiments of the present disclosure. The UAV includes one or more motors. The one or more motors are configured to rotate and actuate one or more propeller blades of the UAV. Remote controller 100 includes trigger 300 as shown in FIG. 3A and in further detail with reference to FIG. 3B.

As shown in FIG. 3B, trigger arm 310 is rotationally attached to bracket 200. In some exemplary embodiments, as shown in FIG. 3B, rotation portion 320 is disposed on bracket 200, and trigger arm 310 is attached to bracket 200 by being rotationally attached to rotation portion 320. In some exemplary embodiments, trigger arm 310 is rotationally attached to bracket 200 without being attached to a rotatable portion such as rotation portion 320. For example, trigger arm 310 is rotationally attached to a portion of bracket 200 that is not rotatable such that when trigger arm 310 rotates, the portion of bracket 200 that trigger arm 310 is attached to does not rotate with trigger arm 310.

In some exemplary embodiments, rotation portion 320 is disposed on bracket 200 with at least one shaft sleeve as shown in FIG. 3B. For example, rotation portion 320 is disposed on bracket 200 with shaft sleeves 351 and 352. In some exemplary embodiments, the at least one shaft sleeve may include two shaft sleeves made of polyoxymethylene. Shaft sleeves made of polyoxymethylene may be less expensive than bearings for the purpose of rotationally supporting rotation portion 320 on bracket 200. Shaft sleeves made of polyoxymethylene may be desirable among shaft sleeves made of different materials because of the relatively low friction so that the user does not feel difficulty pulling trigger 300. In some exemplary embodiments, the friction is not too low such that when the user does not exert a force on trigger arm 320 or when the user is holding the trigger arm 320 at a wanted angular displacement, trigger 300 will not too easily move due to a trivial change of torque on trigger arm 310.

In some exemplary embodiments, rotation portion 320 may be translationally fixed with bracket 200. For example, rotation portion 320 may include protrusions perpendicular to the longitudinal direction; bracket 200 may include position limitation structures in contact with protrusions on rotation portion 320 to prevent rotation portion 320 from moving along the longitudinal direction. As another example, shaft sleeves 351 and 352 may prevent rotation portion 320 from moving in radial direction when rotation portion 320 is received in shaft sleeves 351 and 352. In some exemplary embodiments, remote controller 100 includes position limiting structure preventing trigger arm 310 from rotating beyond a maximum angular displacement.

As described in detail with reference to FIG. 3A, the linear correlation between the angular displacement of trigger arm 310 and the speed controlled based on the user input to trigger 300 is advantageous because the user can have a direct and linear sense of the controlled speed. In some exemplary embodiments, remote controller 100 includes a sensor 340 configured to measure the angular displacement of trigger arm 310. In some exemplary embodiments, trigger arm 310 is fixed with rotation portion 320 and rotates with rotation portion 320 with the same angular displacement. This allows sensor 340 to measure the angular displacement of trigger arm 310 by measuring the angular displacement of rotation portion 320. For example, as shown in FIG. 3B, rotation portion 320 is in contact with sensor 340. Sensor 340 may be a potentiometer capable of directly measuring the angular displacement of rotation portion 320. Remote controller 100 is further configured to control the one or more motors to rotate at a speed proportional to the angular displacement measured by sensor 340. Such direct measurement of the angular displacement may enable a very short response time between the user input on trigger arm 310 and the control of the movable device. The quick response time is especially advantageous when the movable device is moving quickly. For example, when the user is using remote controller 100 to control the rotating speed of one or more motors of a flying UAV, it is important that the user input of speed control via trigger arm 310 is received by the flying UAV as soon as possible.

In some exemplary embodiments, sensor 340 measures the angular displacement of trigger arm 310 by measuring trigger arm 310. For example, trigger arm 310 may be rotationally attached to bracket 200 without rotation portion 320. Sensor 340 may be a distance sensor configured to measure the angular displacement of trigger arm 310 by measuring a displacement of a portion of trigger arm 310 and then determine the angular displacement based on the displacement of the portion of trigger arm 310.

Referring also to FIG. 1C, UAV 190 includes motors 196 that drive propellers 198. In some exemplary embodiments, when trigger 300 rotates in a direction closer to the inside of outer shell 201, the rotation speed of motors 196 of UAV 190 increases. When trigger 300 rotates away from the inside of outer shell 201, the rotation speed of motors 196 of UAV 190 decreases. In another embodiment, when trigger 300 rotates toward the inside of outer shell 201, the rotation speed of motors 196 of UAV 190 is reduced. When trigger 300 rotates away from the inside of outer shell 201, the rotation speed of motors 196 of UAV 190 increases.

As shown in FIG. 3B, trigger 300 includes a trigger arm 310, a connecting portion 325 and a curved covering portion 326. Trigger arm 310 is configured to be held by the user. Trigger arm 310 includes a first curved surface 3241 and an opposite second curved surface 3242. Second curved surface 3242 may be closer to connecting sub bracket 211 relative to first curved surface 3241.

Connecting portion 325 is disposed on second curved surface 3242 and located on first side 321 of trigger 300; connecting portion 325 is sleeved on rotation portion 320 of shaft sleeves 3500 that includes shaft sleeve 351 and shaft sleeve 352. Connecting portion 325 includes a limit surface 3251. When trigger 300 rotates toward the inside of outer shell 201 about rotation portion 320, the limit surface 3251 is used against mounting arm 2123 to restrict the rotation of trigger 300. The maximum extent of trigger 300 rotating into outer shell 201 is limited by limit surface 3251.

A covering portion 326 is disposed on first curved surface 3241 and located on first side 321 of trigger 300, covering portion 326 is also bent, and the bending direction of covering portion 326 is opposite to the bending direction of first curved surface 3242. Covering portion 326 covers the outer side of fourth sub-arm 21234 of mounting arm 2123. When trigger 300 rotates away from the inside of outer shell 201 about rotation portion 320, covering portion 326 is in contact with the outer side of fourth sub-arm 21234 to limit the rotation of trigger 300. The maximum extent of trigger 300 rotating away from outer shell 201 is restricted by covering portion 326.

In some exemplary embodiments, a non-slip structure 32411 is provided on the first curved surface 3241. Non-slip structure 32411 includes at least one of a concave-convex structure, an anti-skid strip, and a frosted structure. When the user holds the non-slip structure 32411, non-slip structure 32411 provides friction for the user to hold trigger 300 firmly. The user may better control the UAV 400 by operating on throttle positions of the trigger 300.

With reference to FIG. 3B, in some exemplary embodiments, trigger arm 310 is provided with a through-hole 3243 for the user's fingers to pass therethrough. Through-hole 3243 is configured to pass through two planes clamped by first curved surface 3241 and second curved surface 3242 of trigger 300. The number of through-holes 3243 can be 1, 2, 3, or more. Through-hole 3243 provides a stable holding of trigger 300 for the user.

With reference also to FIG. 3C, in some exemplary embodiments, trigger 300 includes trigger arm 310, a first bracket 21, and sensor 340. Trigger 300 can be installed on other external devices via first bracket 21.

In some exemplary embodiments, trigger 300 can include trigger arm 310, bracket 200, and sensor 340. Trigger 300 can also be installed on other external devices via any one of first bracket 21, second bracket 22, or third bracket 23, as shown in FIG. 3C.

Figure 3D:
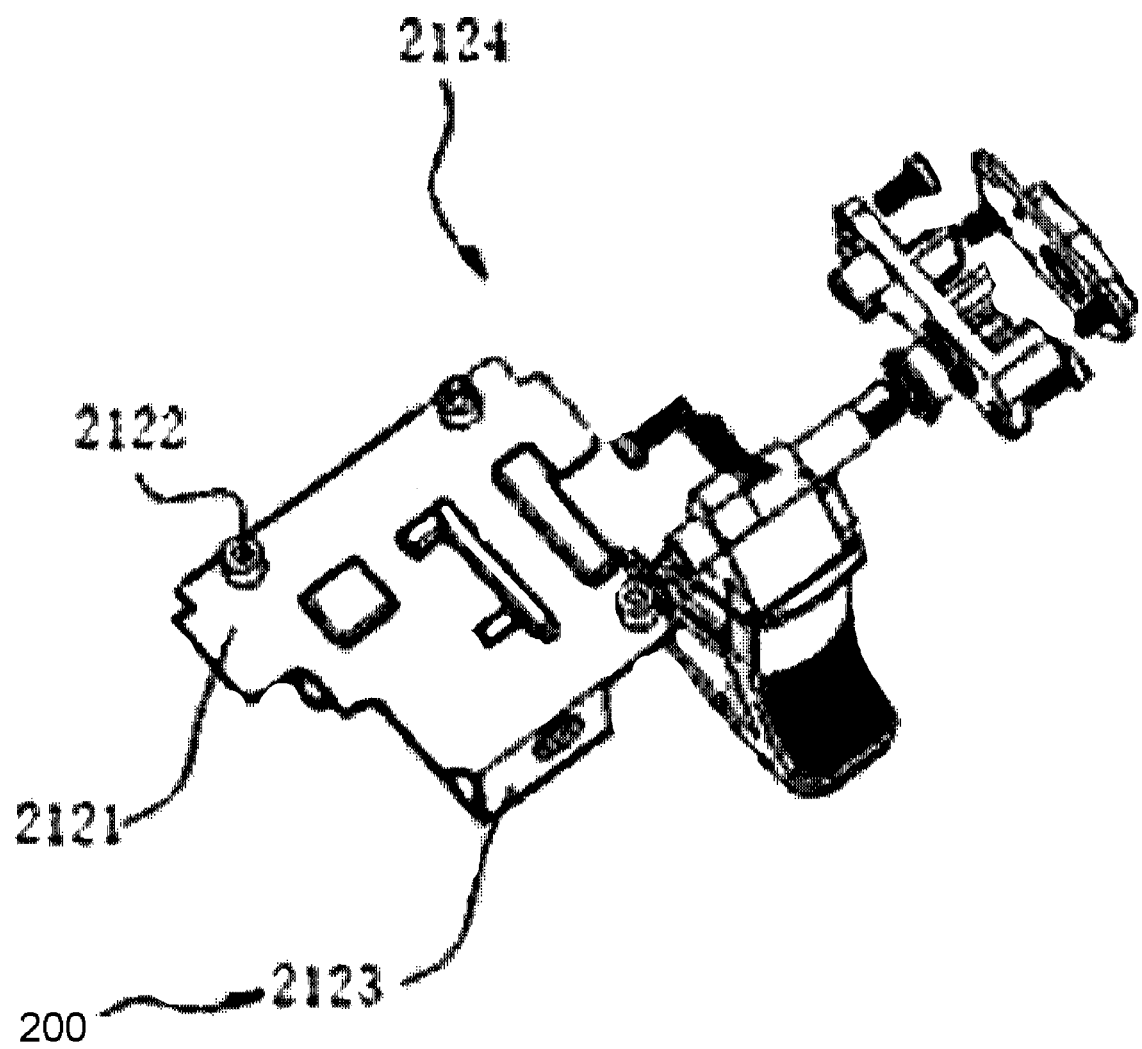
FIG. 3D shows an exploded view of the exemplary trigger according to some exemplary embodiments of the present disclosure.

FIG. 3C shows an exploded view of exemplary bracket 200 according to some exemplary embodiments of the present disclosure, and FIG. 3D shows an exploded view of the exemplary trigger according to some exemplary embodiments of the present disclosure. Bracket 200 includes first bracket 21. First bracket 21 includes a connecting sub bracket 211, a first sub bracket 292, and a second sub bracket 213. First sub bracket 292 is connected with second sub bracket 213 by assembling connecting sub bracket 211 and a second bracket 22.

As shown in FIGS. 3B, 3C, and 3D, first sub bracket 292 includes a first body 2121, an assembly arm 2123, and shaft sleeves 3500. An isolating component 2122 and assembly arm 2123 may be both disposed on first body 2121. Assembly arm 2123 may be configured to form a space 2124. Shaft sleeves 3500 are configured to go through assembly arm 2123 and be fixed to assembly arm 2123.

As shown in FIG. 3C, second sub bracket 213 is disposed on first sub bracket 292, second sub bracket 213, and first sub bracket 292 may be configured to form a space 214. Second sub bracket 213 includes a second component 2131. Isolating component 2122 may be disposed between first body 2121 and second body 2131 to isolate first body 2121 from second body 2131. In some exemplary embodiments, isolating component 2122 may be disposed on second sub bracket 213. In some exemplary embodiments, isolating components 2122 may be disposed on both first body 2121 and second body 2131. Isolating components 2122 may be disposed on either first body 2121 or second body 2131.

A third bracket 23 includes a third bracket body 231 and a cover 232. Third bracket body 231 includes a cavity 2315. Cover 232 may be disposed on third bracket body 231 and be configured to cover cavity 2315. Third bracket body 231 includes a first side 2311, a second side 2312, a third side 2313, and a fourth side 2314 that are sequentially connected. Second side 2312 is on the opposite side of fourth side 2314. Second side 2312 may be disposed closer to second sub bracket 292. Cavity 2315 is disposed on second side 2312. In some exemplary embodiments, cavity 2315 may be disposed on fourth side 2314; cover 232 that covers cavity 2315 may be a dissipating blade for heat dissipation of components contained in cavity 2315 and lowering the temperature of remote controller 100.

In some exemplary embodiments, first bracket 21, second bracket 22, and third bracket 23 form an integral structure such that bracket 200 may not require assembly and disassembly. In some exemplary embodiments, first bracket 21, second bracket 22, and third bracket 23 may be separate components. For example, first bracket 21, second bracket 22, and third bracket 23 may be sequentially connected to form bracket 200. Components may be assembled on each of first bracket 21, second bracket 22, and third bracket 23. Each of first bracket 21, second bracket 22, and third bracket 23 may form a module. Three modules of first bracket 21, second bracket 22, and third bracket 23 may be sequentially connected. Assembly of modules makes it easier to assemble remote controller 100. In some exemplary embodiments, first bracket 21, second bracket 22, and third bracket 23 may be separably connected in an order of first bracket 21, second bracket 22, and third bracket 23, making it easier to repair or perform maintenance of the brackets. This may extend the usage life of remote controller 100. In some exemplary embodiments, any two of first bracket 21, second bracket 22, and third bracket 23 may form an integral structure. The two integral brackets may then be connected with the other of the brackets. Such connection may be disassembled. In some exemplary embodiments, any two of first bracket 21, second bracket 22, and third bracket 23 may be connected and fixed together. The two brackets may be connected with the other bracket. The connection between the two brackets and the other bracket may be disassembled.

In some exemplary embodiments, first sub-bracket 292 is obliquely connected with connecting sub-bracket 211, forming a movement space 2111.

In some exemplary embodiments, bracket 200 may be made of the same material. For example, bracket 200 may be made of a metal material. First bracket 21, second bracket 22, and third bracket 23 may be all made of a metal material. The metal material may allow quick heat dissipation in remote controller 100 and prevent overheating of the remote control. In some exemplary embodiments, bracket 200 may be made of an alloy material. The alloy material may allow quick heat dissipation of remote controller 100 and may also reduce the manufacturing cost. In some exemplary embodiments, bracket 200 may be made of carbon nanotubes. In addition to the benefit of quick heat dissipation, the weight of bracket 200 may be reduced. In some exemplary embodiments, bracket 200 may be made of different materials. For example, first sub bracket 292, second sub bracket 213, second bracket 22, and third bracket 23 may be made of a metal material, an alloy material, carbon nanotubes or a high thermal conductivity material, connecting sub bracket 211 may be made of non-thermal conductive plastic. As the position of connecting sub bracket 211 does not require transfer of very much heat, heat generated by components disposed on first sub bracket 292 and second sub bracket 213 may not be transferred to holding portion 160 corresponding to third bracket 23. Overheating of holding portion 160 may be prevented, thereby improving user experience. The metal materials may include copper, iron, aluminum, and magnesium. Alloys may include copper alloys, iron alloys, aluminum alloys, and magnesium alloys.

Figure 4A:
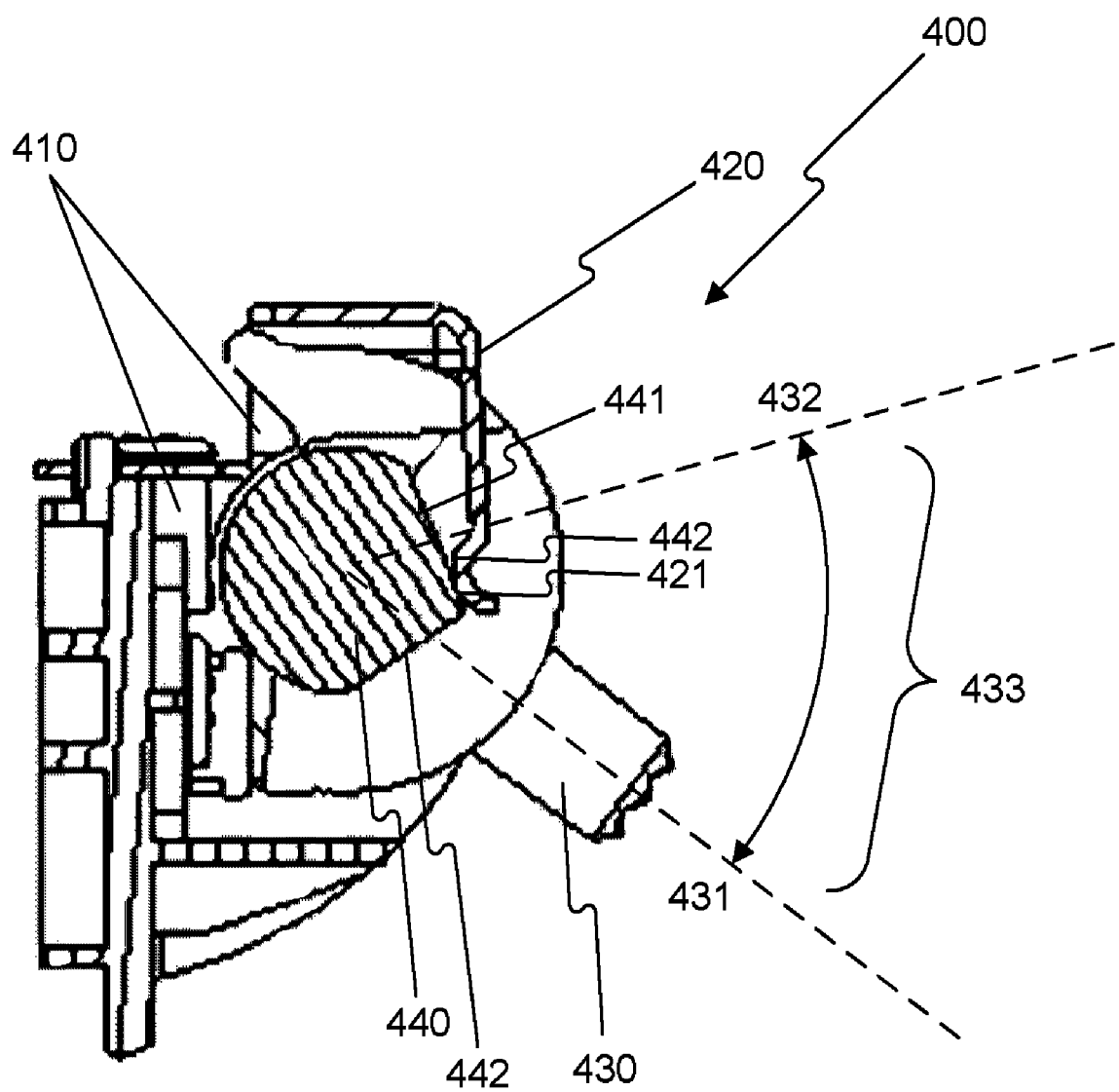
FIG. 4A shows an exemplary switch according to some exemplary embodiments of the present disclosure.

FIG. 4A shows an exemplary switch 400 according to some exemplary embodiments of the present disclosure. Switch 400 includes a bracket 410 and an elastic device 420 with one end attached to bracket 410. In some exemplary embodiments, switch 400 includes an operating member 430 rotatably coupled to bracket 410, where operating member 430 is configured to move between a first position 431 and a second position 432. Switch 400 also includes a transition position 433 between first position 431 and second position 432. As shown in FIG. 4A, transition position 433 may be a range of positions including some or all of positions between first position 431 and second position 432. When operating member 430 is at transition position 433, operating member 430 receives a transition torque from one or more components of switch 400 towards first position 431 or second position 432, depending on where in the range of positions within transition position 433 operating member 430 has moved to. The transition torque may be a net torque applied by elastic device 420 to operating member 430. Operating member 430 may include a shaft, a trigger arm, a button, or other suitable device, or a combination thereof. For example, as shown in FIG. 4A, operating member 430 is a shaft. Switch 400 is implemented in remote controller 100 or a remote control system including remote controller 100 and a UAV, where bracket 410 is a portion of bracket 200, as described with reference to FIGS. 2A-2C.

Figure 4B:
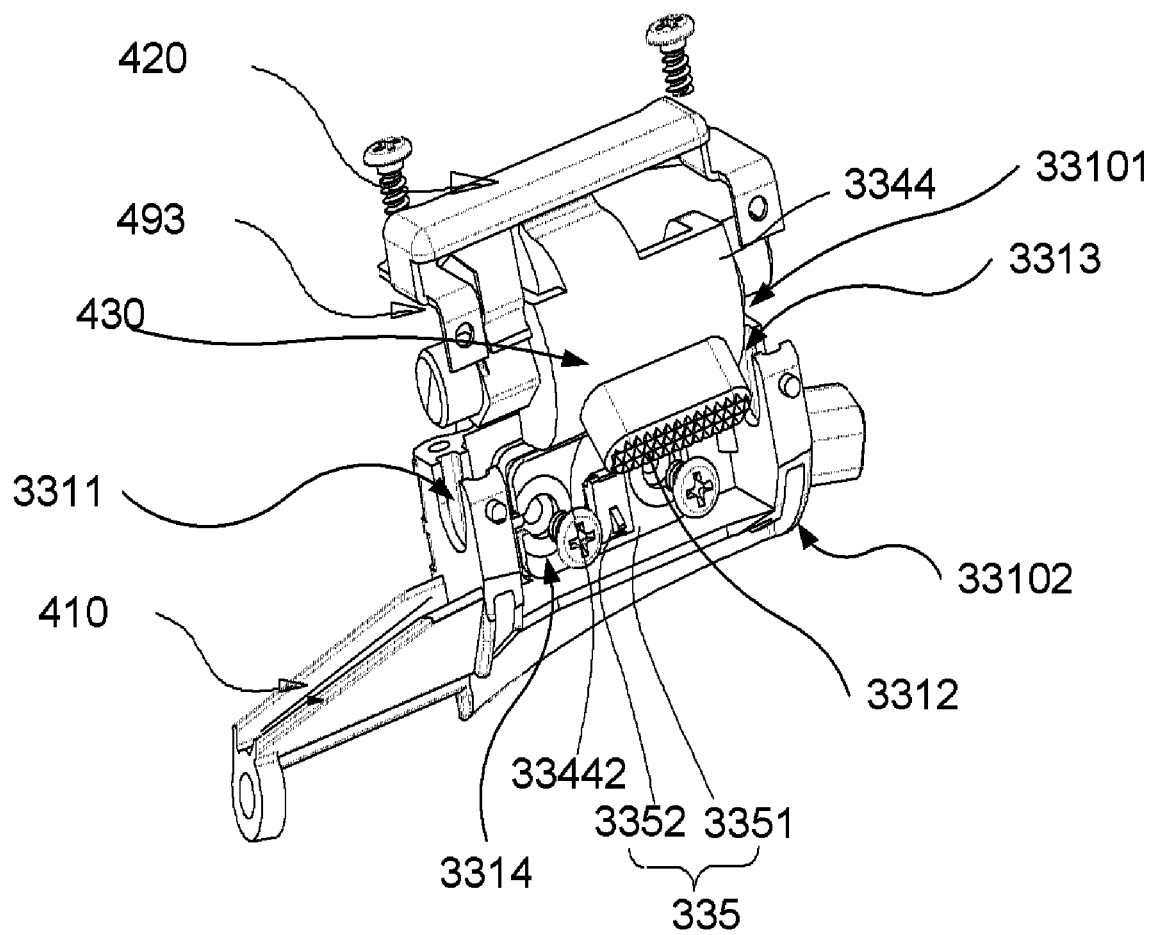
FIG. 4B shows a perspective view of the exemplary switch according to some exemplary embodiments of the present disclosure.

FIG. 4B shows a perspective view of exemplary switch 400 according to some exemplary embodiments of the present disclosure. Operating member 430 is disposed on bracket 410 and is at least partially received in a receiving cavity 493. Operating member 430 can rotate relative to bracket 410 to switch between a first position and a second position so as to selectively lock and unlock propellers 198 of UAV 196. When operating member 430 is switched between the first position and the second position, operating member 430 is in a transition position. In the transition position, elastic device 420 and operating member 430 make contact to allow operating member 430 to switch to the first position or the second position.

Referring also to FIG. 4A, bracket 410 includes a first side 441 and an opposite second side 442. Bracket 410 includes a first side wall 3311, a second side wall 3312, and a third side wall 3313 connected in sequence. First side wall 3311 is opposite to third side wall 3313, and the side of bracket 410 opposite to second side wall 3312 is an open side. First side wall 3311, second side wall 3312, and third side wall 3313 jointly enclose an installation cavity 3314, and installation cavity 3314 is configured to accommodate operating member 430.

In some exemplary embodiments, operating member 430 includes a protrusion 440. Protrusion 440 rotates with operating member 430 with the same angular displacement. Therefore, when operating member 430 moves to transition position 433 between first position 431 and second position 432, protrusion 440 moves between first position 431 and second position 432 according to the movement of operating member 430.

In some exemplary embodiments, protrusion 440 includes a first side 441 and a second side 442. When first side 441 is in contact with elastic device 420, the net torque applied by elastic device 420 to operating member 430 is towards first position 431, and when second side 442 is in contact with elastic device 420, the net torque applied by elastic device 420 to operating member 430 is towards second position 432. First position 431 and second position 432 correspond to two states to be controlled by switch 400. For example, first position 431 may correspond to a power-on state of a UAV and second position 432 may correspond to a power-off state of the UAV. As another example, first position 431 may correspond to a locked state of a UAV and second position 432 may correspond to an unlocked state of the UAV. In the locked state of the UAV, the rotor-blade assembly of the UAV may, for example, be prevented from rotating. In the unlocked state of the UAV, the rotor-blade assembly of the UAV may, for example, be allowed to rotate. Such net torque provides an "initial resistance" such that when the user is switching between the two states by moving operating member 430 from either first position 431 or second position 432 to the other, the user needs to overcome the initial resistance in order to reach the other state/position. This may reduce the possibility of accidental switching of the state caused by an accidental touch of on operating member 430. This also provides the user via feeling of handling operating member 430 an assurance of changing of the state.

In some exemplary embodiments, elastic device 420 includes a first curved portion 421 and a second curved portion 422. When first side 441 is in contact with elastic device 420, first side 441 is in contact with elastic device on first curved portion 421, and the net torque from elastic device 420 to operating member 430 may be towards first position 431. When second side 442 is in contact with elastic device 420, second side 442 is in contact with elastic device 420 on second curved portion 422, and the net torque from elastic device 420 to operating member 430 is towards second position 432.

In some exemplary embodiments, first curved portion 421 and second curved portion 422 are identical halves of an arc portion of elastic device 420, as shown in FIG. 4A. In some exemplary embodiments, first curved portion 421 and second curved portion 422 are not identical halves.

In some exemplary embodiments, switch 400 is configured in such a way that it is easier to move from first position 431 to second position 432 than to move from second position 432 to first position 431. Similarly, switch 400 is configured in such a way that it is easier to move from second position 432 to first position 431 than to move from first position 431 to second position 432. For example, in a movement of protrusion 440 and operating member 430 from first position 431 to second position 432, an average net torque towards first position 431 is larger than an average net torque towards second position 432. In some exemplary embodiments, such a configuration is useful for situations in which switch 400 is kept in one of the two states during certain operation. For example, when switch 400 has one state of locking and the other state of unlocking, it may be desirable to make the movement of operating member 430 for unlocking more difficult than the movement for locking for safety concerns. Such configuration is achieved by a difference between first side 441 and second side 442, a difference between first curved portion 421 and second curved portion 422, the comparative locations of protrusion 440 and elastic device 420, or the like, or a combination thereof. This is advantageous because when the easiness of moving operating member 430 from one position to the other needs to be adjusted, the corresponding scaled-up manufacturing process of switch 400 has the flexibility to choose in which way to achieve such adjustment in the configuration.

Figure 4C:
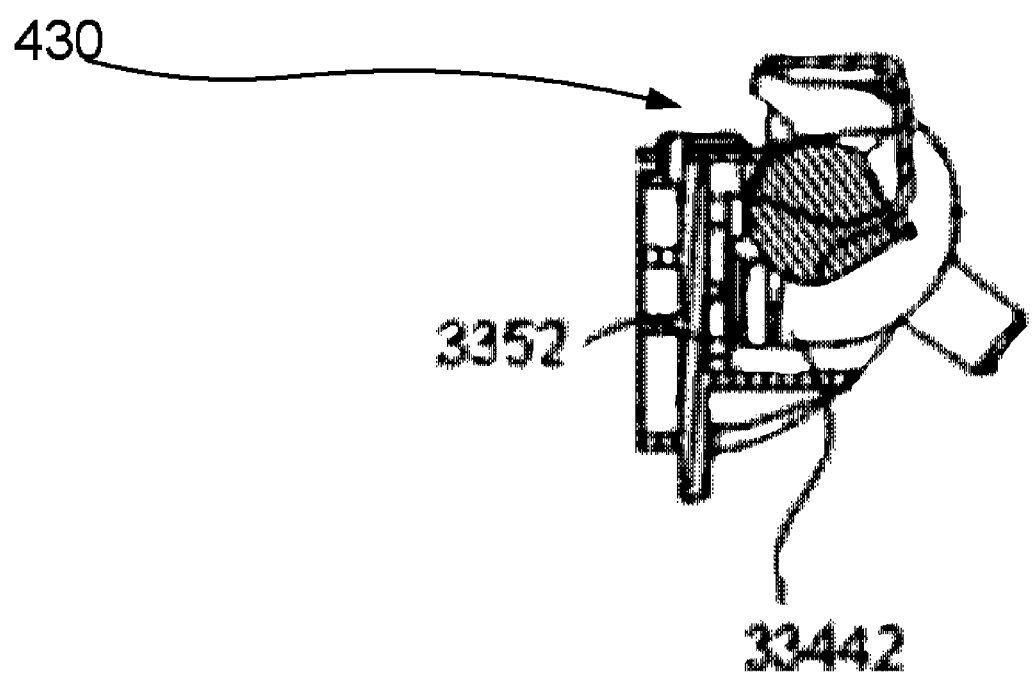
FIGS. 4C and 4D show the exemplary switch with an operating member in different positions according to some exemplary embodiments.
Figure 4D:
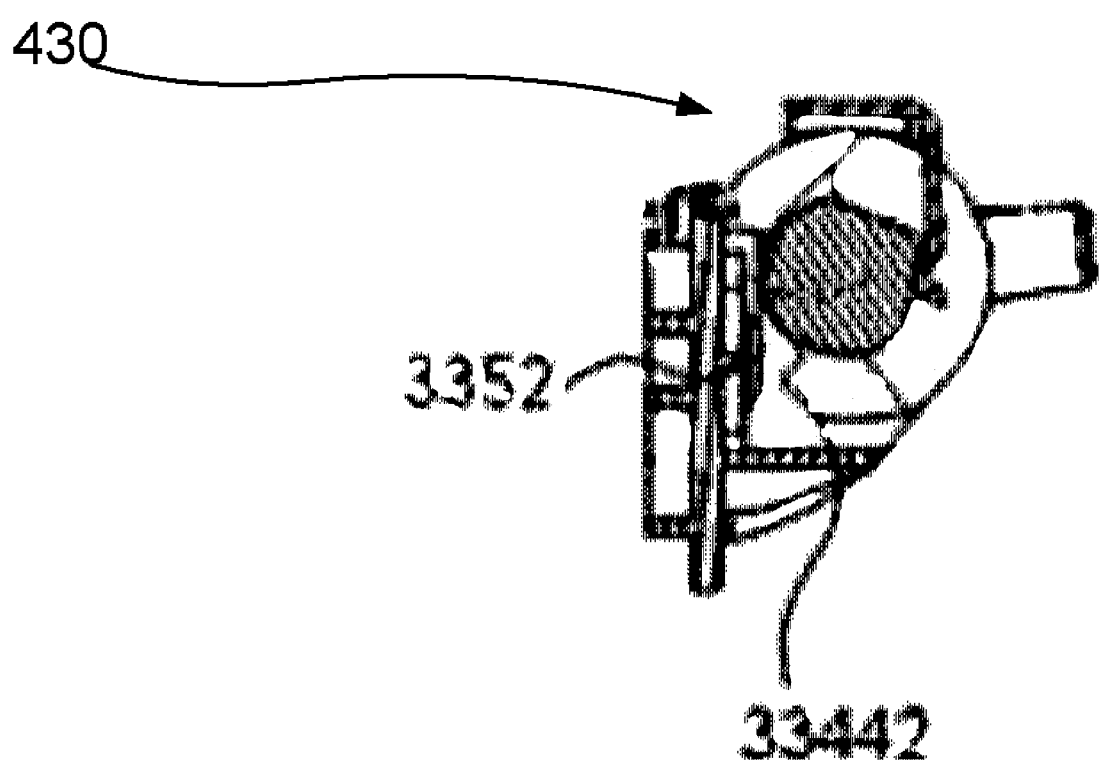

As shown in FIG. 4B, switch 400 may further include a position detecting device 335. When operating member 430 is in the second position, a second side 33442 of toggle body 3344 is toggled to trigger position detecting device 335. In some exemplary embodiments, position detecting device 335 is detachably installed on an inner wall of bracket 410 and is located between toggle body 3344 and the inner wall of bracket 410. For example, position detection device 335 includes a position detection board 3351 and a position detection switch 3352. Position detection board 3351 is arranged on the inner wall of bracket 410, and position detection board 3351 is configured to electrically connect with an external circuit board to transmit electrical signals. Position detection switch 3352 is arranged on the side of position detection board 3351 close to toggle body 3344 and is configured to electrically connect to position detection board 3351. FIGS. 4C and 4D show switch 400 with operating member 430 in different positions, in accordance with exemplary embodiments. As shown in FIG. 4C, when operating member 430 is in the second position, second side 33442 of operating member 430 is pressed against a detection switch 3352 to trigger position detection device 335. As shown in FIG. 4D, when second side 33442 of operating member 430 is moved away from detection switch 3352, detection switch 3352 can be reset. Switch 400 is configured to detect the position of operating member 430 through position detecting device 335, so as to determine whether operating member 430 is in the second position.

Figure 4E:
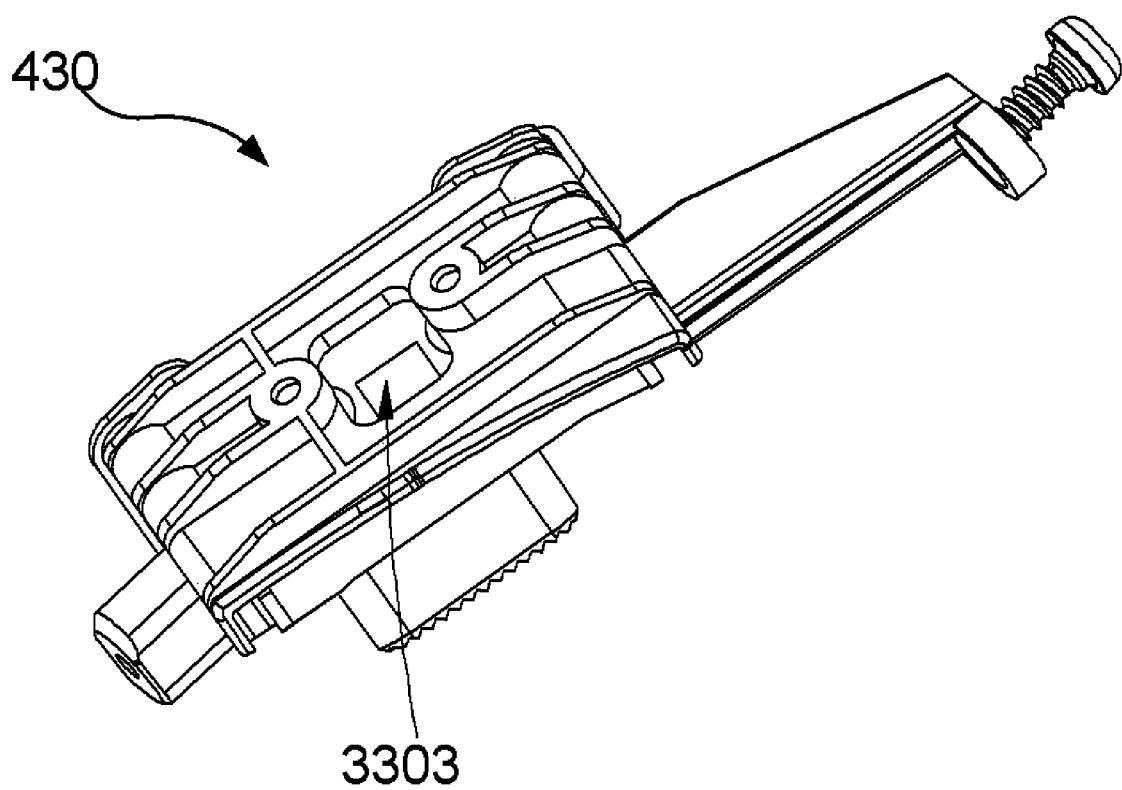
FIG. 4E shows a perspective view of the operating member of the exemplary switch shown in FIG. 4A according to some exemplary embodiments of the present disclosure.

FIG. 4E shows a perspective view of operating member 430 in accordance with exemplary embodiments. With reference to FIG. 4E, in some exemplary embodiments, a wire hole 3303 is also provided on bracket 410 for circuit layout of position detection board 3351, which provides proper circuit layout of position detection board 3351 and improves the assembly of remote controller 100.

Figure 5:
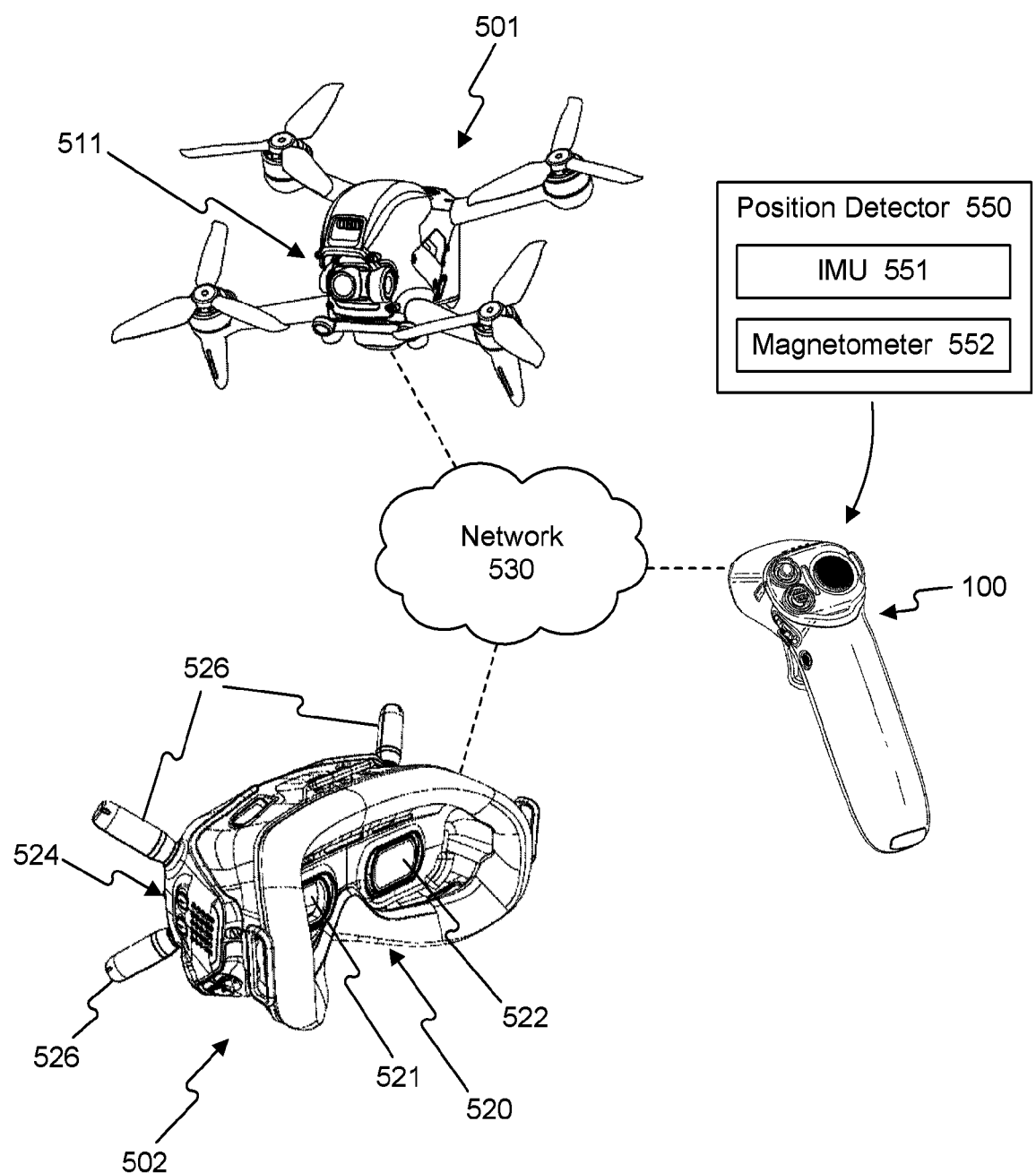
FIG. 5 shows an exemplary remote control system according to some exemplary embodiments of the present disclosure.

FIG. 5 shows an exemplary remote control system 500 according to some exemplary embodiments of the present disclosure. Remote control system 500 includes a UAV 501, a remote controller 100 as described with reference to FIGS. 1A-2C, and a head mounted device 502. In some exemplary embodiments, remote control system 500 includes other devices such as a mobile device or a cloud-based server.

In some exemplary embodiments, UAV 501 includes an imaging sensor 511. Imaging sensor 511 may be a photographic camera, a video camera, an infrared imaging device, an ultraviolet imaging device, an x-ray device, an ultrasonic imaging device, a radar device, etc. In some exemplary embodiments, UAV 501 may further include one or more imaging sensors 511 disposed at different locations of UAV 501 to capture data based on different angles, views, and/or technologies.

Head mounted device 502 is configured to be worn on the head of the user and includes a display 520. In some exemplary embodiments, head mounted device 502 is in a general shape of a pair of glasses and display 520 includes two display screens 521 and 522 corresponding to the user's left eye and right eye, respectively. In some exemplary embodiments, display screens 521 and 522 are configured to show a three-dimensional (3D) display of an image or video streamed to the user. In some exemplary embodiments, display screens 521 and 522 are configured to show a two-dimensional (2D) display of an image or video streamed to the user. Head mounted device 502 may include one or more user input devices 524 on its outer surface. For example, user input devices 524 may include one or more buttons on a side of the outer surface of head mounted device 502.

In some exemplary embodiments, devices of remote control system 500 communicate with each other through a network 530. For example, UAV 501 is capable of transmitting data captured by imaging sensor 511 (image data) to remote controller 100 and head mounted device 502 via network 530. In some exemplary embodiments, UAV 501 may include a processor or an image processing module to process the data captured by imaging sensor 511 before transmitting to other devices in network 530. In some exemplary embodiments, devices other than UAV 501 may process the data captured by imaging sensor 511. For example, remote control system 500 may include a server or a mobile device configured to process the data captured by imaging sensor 511 and then transmit the processed data to other devices in remote control system 500 such as head mounted device 502 or UAV 501. In some exemplary embodiments, devices of remote control system 500 communicate in real-time via any suitable communication technologies, such as local area network (LAN), wide area network (WAN) (e.g., the Internet), cloud environment, telecommunications network (e.g., 3G, 4G, 5G), WiFi, Bluetooth, radiofrequency (RF), infrared (IR), or any other communication technologies.

In some exemplary embodiments, head mounted device 502 includes one or more antennas 526 that are electrically connected to one or more processors of head mounted device 502. The one or more processors of head mounted device 502 communicate with other devices in remote control system 500 via antenna 526, such as remote controller 100 and UAV 501. In some exemplary embodiments, remote control system 500 has one or more communication links for data communication among UAV 501, remote controller 100, and head mounted device 502. For example, remote control system 500 may have a first communication link for transmitting flight control data and a second communication link for transmitting vision data. The one or more processors of head mounted device 502 may be capable of converting data received via the one or more antennas 526 to image or video stream to be displayed on display 520. The one or more processors of head mounted device 502 may also be capable of processing data and user input received via the one or more antennas 526 and user input devices 524 to generate one or more images or a video stream to be displayed on display 520. As another example, remote control system 500 may have a communication link transmitting data between remote controller 100 and head mounted device 502. The one or more processors of head mounted device 502 may process user inputs from remote controller 100 and convert the user inputs to information shown on display 520 or cause adjustment of what is shown on display 520. The user may use the user input devices on head mounted device 502, user input devices on remote controller 100, or a combination thereof, to make selections and operations based on information shown on display 520. In some exemplary embodiments, the one or more antennas 526 may receive data captured by imaging sensor 511 that is already processed by one or more other devices of remote control system 500, such as UAV 501, a mobile device, a server, or a combination thereof, which reduce the requirements for data processing capability of head mounted device 502.

Figure 6:
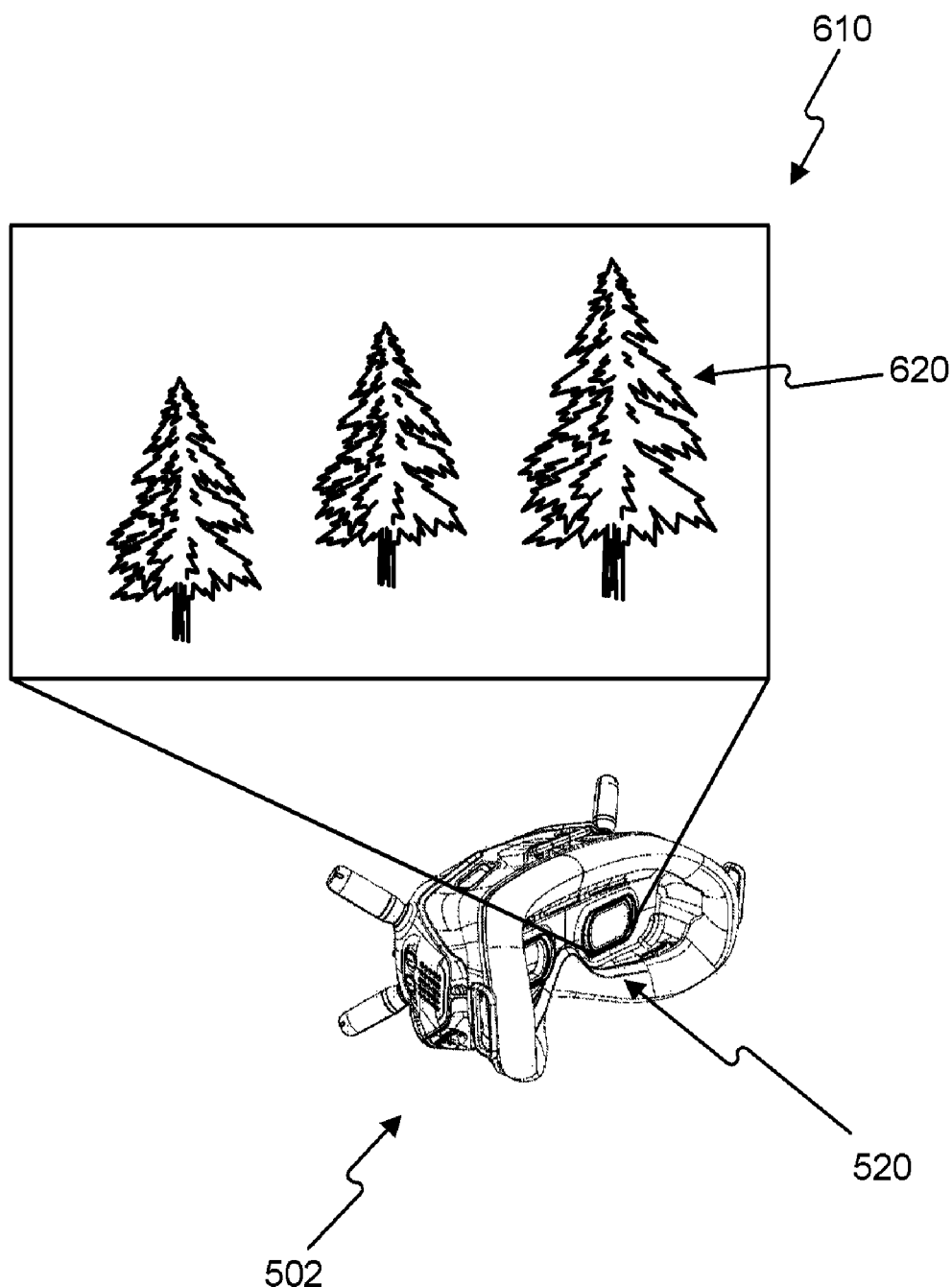
FIG. 6 shows a demonstration of a display under an exemplary control mode of remote control system 500 according to some exemplary embodiments of the present disclosure.

FIG. 6 shows a demonstration of display 520 in an exemplary control mode of remote control system 500 according to some exemplary embodiments of the present disclosure. An area 610 is an enlarged view of a display area of display 520 to illustrate what display 520 shows the user. Display 520 is configured to show one or more images or a video stream based on data received through the one or more communication links of remote control system 500, such as vision data from UAV 501. For example, area 610 includes view 620 showing one or more images or a video stream captured by imaging sensor 511. View 620 is generated by the one or more processors of head mounted device 502 based on data received via the one or more antennas 526.

Display 520 is also configured to show information of remote control system 500.

Referring again to FIG. 5, in some exemplary embodiments, remote control system 500 includes a position detector 550 and is capable of determining position status of remote controller 100 based on position data measured by position detector 550. Position detector 550 is disposed on outer shell 201 of remote controller 100 or inside remote controller 100. Position detector 550 may include one or more inertial sensors, such as inertial measurement unit (IMU) sensors, including accelerometers, gyroscopes, and/or magnetometers. Position detector 550 may further include other positioning sensors, such as imaging sensors, compasses, positioning systems (e.g., GPS, GLONASS, Galileo, Beidou, GAGAN, RTK, etc.), motion sensors, and/or proximity sensors. Position status includes attitude, orientation, elevation, relative location compared to a reference object such as the Earth, etc. Position data includes data related to a determination of position status. For example, position data may be attitude information (e.g., angular velocity, rotational acceleration, tilt, translational movement acceleration, a specific force on a body, etc.), orientation information, or relative distance to surroundings or a reference object.

Remote control system 500 determines position status of remote controller 100 based on position data measured by position detector 550. In some exemplary embodiments, remote control system 500 determines position status of remote controller 100 by using one or more processors of remote controller 100 to process the position data. In some exemplary embodiments, position data is transmitted to other devices of remote control system 500, such as UAV 501, head mounted device 502, a mobile device, or a server. The other devices of remote control system 500 then determine the position status of remote controller 100 based on the received position data. The determined position status may then be transmitted to remote control system 500 and its devices and components, such as head mounted device 502.

In some exemplary embodiments, position detector 550 includes an inertial measurement unit (IMU) 551 configured to measure attitude information of remote controller 100. Attitude information may include angular velocity, rotational acceleration, translational movement acceleration, a specific force on a body, etc. IMU 551 measures attitude information using one or more accelerometers, one or more gyroscopes, or a combination thereof. Remote control system 500 determines attitude status of remote controller 100 based on attitude information measured by IMU 551. In some exemplary embodiments, the one or more processors of remote controller 100 determine the attitude status of remote controller 100 based on attitude information measured by IMU 551. In some exemplary embodiments, other devices or components of remote control system 500 (e.g., UAV 501, a mobile device, or head mounted device 502), determine the attitude status of remote controller 100 based on attitude information measured by IMU 551.

In some exemplary embodiments, position detector 550 includes a magnetometer 552 configured to obtain orientation information of remote controller 100. Orientation information may be a measure of magnetic field or a magnetic dipole moment. For example, magnetometer 552 may be a compass configured to measure the Earth's magnetic field and thereby obtain orientation information of remote controller 100. Remote control system 500 determines the orientation of remote controller 100 based on orientation information measured by magnetometer 552. In some exemplary embodiments, the one or more processors of remote controller 100 determine the orientation of remote controller 100 based on orientation information measured by magnetometer 552. In some exemplary embodiments, other devices or components of remote control system 500 determine the orientation of remote controller 100 based on orientation information measured by magnetometer 552.

In some exemplary embodiments, display 520 shows the position status of remote controller 100 received by remote control system 500. Display 520 may show the position status of remote controller 100 as a default setting or based on the user's request.

In some exemplary embodiments, remote controller 100 is a somatosensory remote controller with one or more somatosensory control modes, such that position data measured by position detector 550 or position status of remote controller 100 is used for controlling the position status of UAV 501. For example, in a somatosensory control mode, remote controller 100 is configured to control the movement of UAV 501 based on the attitude status of remote controller 100. When remote controller 100 is tilted to the left side, UAV 501 moves towards the left side direction.

In some exemplary embodiments, remote controller 100 has one or more control modes. The user can choose different control modes by using user input devices on remote controller 100 or other devices of remote control system 500, such as a mobile device or head mounted device 502. In some exemplary embodiments, control component 131 is a trigger and includes trigger arm 132. Control component 131 and trigger arm 132 are disclosed in more detail with reference to FIGS. 3A and 3B as trigger 300 and trigger arm 310 respectively. One control mode may be an "electric torch" mode. In the electric torch mode, when the user pulls trigger arm 132 such that trigger arm 132 is moved away from an initial (angular) position by a displacement greater than a predetermined threshold, UAV 501 moves forward. When the user stops pulling and releases trigger arm 132, trigger arm 132 moves back to the initial angular position, and UAV 501 stops moving and starts hovering at its current location. In other words, in the electric torch mode, UAV 501 moves only when the user pulls trigger arm 132. In some exemplary embodiments, in a default mode or default setting UAV 501 moves in the forward direction at a movement speed substantially proportional to the angular displacement of trigger arm 132 away from the initial angular position. In the electric torch mode, the user can wear head mounted device 502; control UAV 501 by using remote controller 100; see real-time image or video stream captured by imaging sensor 511 of UAV 501 on display 520; and see real-time attitude status of remote controller 100 on display 520.

It is to be understood that the disclosed exemplary embodiments are not necessarily limited in their application to the details of construction and the arrangement of the components set forth in the following description and/or illustrated in the drawings and/or the examples. The disclosed exemplary embodiments may have variations, or may be practiced or carried out in various ways.

In FIGS. 1A and 1B, remote controller 100 is configured to be held and operated by the right hand of the user. A configuration in mirror symmetry according to the present disclosure may be constructed to provide a remote controller suitable for being held and operated by the left hand of the user. For example, the configuration with respect to first side 110 of a remote controller suitable for being held by a right hand, as described with reference to FIGS. 1A and 1B, can be the configuration with respect to second side 140 for a controller suitable for being held by a left hand; and the configuration with respect to second side 140 of a controller suitable for being held by a right hand, as described with reference to FIGS. 1A and 1B, can be the configuration with respect to first side 110 for a controller suitable for being held by a left hand. As another example, component 123 is positioned on the left side of rear side 120 for a remote controller suitable for being held by a left hand. Similarly, remote controller 100 shown in FIGS. 2A-2C is configured to be held and operated by the right hand of the user. A configuration in mirror symmetry according to the present disclosure can be constructed to provide a remote controller suitable for being held and operated by the left hand of the user.

The words "side" and "face" used herein are also not limited to the description and/or illustrated in the drawings and/or the examples. For example, rear side 120 can be referred to as "rear face 120" and front face 130 can be referred to as "front side 130", both without changing how rear side/face 120 and front face/side 130 are practiced and implemented according to the present disclosure. As another example, rear side 120 and front face 110 can each be referred to as a first side or a second side of remote controller 100 according to the present disclosure.

It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with the scope of protection being indicated by the following claims and their equivalents.

What is claimed is:

1. A remote controller, comprising:
 a handheld portion, comprising a top portion, a remainder portion, a first side and a front face, wherein the remainder portion has a top-bottom axis, and the front face is adjacent to the first side and faces in a front direction relative to a user;
 a first control component on the first side to receive a first user input from a first finger of one hand of the user;
 a second control component on the front face to receive a second user input from a second finger of the hand; and
 a third control component on a rear side of the top portion to receive a third user input from a third finger of the hand,
 wherein the top portion extends from the remainder portion at a second acute angle with respect to the top-bottom axis for the third finger to stretch thereto and operate thereon.

2. The remote controller according to claim 1, wherein the remote controller is a somatosensory remote controller to control a movable device; and
 the remote controller is configured to receive somatosensory inputs generated by a movement of the remote controller.

3. The remote controller according to claim 2, wherein the first control component is configured to receive the first user input generated by a movement of the first finger; and
 the movement of the remote controller that generates the somatosensory inputs are not affected by the movement of the first finger that generates the first user input.

4. The remote controller according to claim 2, wherein the first control component is configured to receive the first user input to control at least one midcourse task device; and
 the somatosensory inputs control a movement of the movable device.

5. The remote controller according to claim 1, wherein the second control component is a trigger comprising a trigger arm rotationally fixed on the remote controller.

6. The remote controller according to claim 5, wherein the remote controller is a controller of a movable device; and
 the movable device is an unmanned aerial vehicle (UAV); and
 the second control component is further configured to receive the second user input to control a movement speed of the UAV.

7. The remote controller according to claim 6, wherein
a force is required to keep the trigger arm at an angular displacement away from an initial angular position; and
the second control component is further configured to receive the second user input to control the movement speed of the UAV to be proportional to the angular displacement of the trigger arm.

8. The remote controller according to claim 7, wherein when the trigger arm is at the initial angular position, the remote controller controls the UAV to hover.

9. The remote controller according to claim 8, wherein when the trigger arm is at the angular displacement away from the initial angular position, the UAV moves forward at the movement speed proportional to the angular displacement.

10. The remote controller according to claim 1, wherein the third finger is same as the first finger or different from the first finger.

11. The remote controller according to claim 1, wherein the third control component is configured to receive at least one of the third user input to lock or unlock the movable device, or a brake command to reduce a speed of a movable device controlled by the remote controller.

12. The remote controller according to claim 1, further comprising:
a brake control component on the rear side of the top portion, configured to receive a brake command from the first finger of the hand to reduce a speed of a movable device controlled by the remote controller, wherein
the brake control component is arranged on the rear side of the top portion farther from the first side.

13. The remote controller according to claim 1, further comprising:
an antenna portion extending from the top portion at a first acute angle with the top portion, and extending further forward than the top portion; and
an antenna housed in the antenna portion.

14. The remote controller according to claim 13, wherein the top portion extends from the top-bottom axis at the second acute angle, and extends further forward than the remainder portion.

15. The remote controller according to claim 14, further comprising:
a main bracket disposed inside the remote controller to accommodate the first acute angle and the second acute angle, comprising:
a first bracket portion disposed inside the antenna portion,
a second bracket portion disposed inside the top portion, and
a third bracket portion disposed inside the remainder portion.

16. The remote controller according to claim 1, further comprising:
a bracket;
a trigger arm, rotationally attached to the bracket, to control an unmanned aerial vehicle (UAV) remotely controlled by the remote controller; and
a sensor configured to measure an angular displacement of the trigger arm, wherein
the trigger arm is configured to control one or more motors of the UAV to rotate at a speed based on the angular displacement measured by the sensor.

17. A remote control system, comprising:
an unmanned aerial vehicle (UAV);
a remote controller to control the UAV; and
a head mounted device with a display configured to display one or more images or videos captured by the UAV, wherein
the remote controller comprises:
a handheld portion, comprising a top portion, a remainder portion, a first side and a front face, wherein the remainder portion has a top-bottom axis, and the front face is adjacent to the first side and faces in a front direction relative to a user,
a first control component on the first side, to receive a first user input from a first finger of one hand of the user,
a second control component on the front face to receive a second user input from a second finger of the hand, and
a third control component on a rear side of the top portion to receive a third user input from a third finger of the hand,
wherein the top portion extends from the remainder portion at a second acute angle with respect to the top-bottom axis for the third finger to stretch thereto and operate thereon.

18. The remote control system according to claim 17, wherein
the UAV comprises an imaging sensor configured to capture image data; and
the display is configured to display the one or more images or videos based on the image data.

19. The remote control system according to claim 17, wherein
the remote controller further comprises an inertial measurement unit (IMU) configured to measure attitude information of the remote controller; and
the display is configured to display an attitude status of the remote controller based on the attitude information.

20. The remote control system according to claim 19, wherein
the remote controller is configured to operate in one or more control modes; and
the one or more control modes comprise a default mode.

* * * * *